United States Patent
Kobayashi

(10) Patent No.: US 10,275,192 B2
(45) Date of Patent: Apr. 30, 2019

(54) INFORMATION PROCESSING APPARATUS, IMAGE PROCESSING SYSTEM, AND PRINTER DRIVER

(71) Applicant: Hiroto Kobayashi, Saitama (JP)

(72) Inventor: Hiroto Kobayashi, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/697,404

(22) Filed: Sep. 6, 2017

(65) Prior Publication Data
US 2018/0067704 A1  Mar. 8, 2018

(30) Foreign Application Priority Data

Sep. 8, 2016 (JP) .................. 2016-175789
Nov. 25, 2016 (JP) .................. 2016-228771
Jul. 18, 2017 (JP) .................. 2017-139328

(51) Int. Cl.
*G06F 3/12* (2006.01)

(52) U.S. Cl.
CPC .......... *G06F 3/1225* (2013.01); *G06F 3/1205* (2013.01); *G06F 3/1228* (2013.01); *G06F 3/1231* (2013.01); *G06F 3/1232* (2013.01); *G06F 3/1255* (2013.01); *G06F 3/1272* (2013.01); *G06F 3/1285* (2013.01)

(58) Field of Classification Search
USPC .................. 358/1.1–3.29; 399/8–13
See application file for complete search history.

(56) References Cited

U.S. PATENT DOCUMENTS

| 2007/0216939 A1* | 9/2007 | Wada .................. G06F 3/1206 358/1.15 |
| 2010/0302589 A1 | 12/2010 | Kobayashi |
| 2011/0058199 A1 | 3/2011 | Kobayashi |

(Continued)

FOREIGN PATENT DOCUMENTS

| EP | 2924557 A1 | 9/2015 |
| JP | 2015-215653 | 12/2015 |
| JP | 2015-225481 | 12/2015 |

OTHER PUBLICATIONS

European Search Report EP17189970; dated Jan. 23, 2018.
Microsoft; Developing v4 Print Drivers v1.3; Sep. 28, 2012.

*Primary Examiner* — Marcellus J Augustin
(74) *Attorney, Agent, or Firm* — Duft & Bornsen, PC

(57) ABSTRACT

An information processing apparatus communicably connected with a printer, includes: a plurality of applications including at least a first application and a second application; a printer driver to control display of a screen for performing print settings for the printer, including a first module to accept a print request from the first application and a second module to accept a print request from the second application. The first module includes: an acquirer to acquire model identification information identifying a model of the printer currently connected with the information processing apparatus through a network; and a storage controller to store connection destination information according to the model of the printer in a storage area that is accessible from the second module. The second module displays a screen according to the model of the printer using the connection destination information read from the storage area.

14 Claims, 32 Drawing Sheets

(56) References Cited

U.S. PATENT DOCUMENTS

| | | | |
|---|---|---|---|
| 2011/0188064 A1* | 8/2011 | Awata | G06F 3/12 358/1.13 |
| 2011/0286036 A1 | 11/2011 | Kobayashi | |
| 2012/0140269 A1 | 6/2012 | Kobayashi | |
| 2013/0044335 A1 | 2/2013 | Kobayashi | |
| 2013/0094056 A1 | 4/2013 | Kobayashi | |
| 2013/0250331 A1 | 9/2013 | Kobayashi | |
| 2014/0063522 A1 | 3/2014 | Kobayashi | |
| 2015/0169267 A1 | 6/2015 | Hirakawa | |
| 2015/0254026 A1 | 9/2015 | Kobayashi et al. | |
| 2016/0077777 A1 | 3/2016 | Kobayashi et al. | |
| 2016/0085484 A1* | 3/2016 | Ichikawa | G06F 3/1205 358/1.13 |
| 2017/0078520 A1 | 3/2017 | Kobayashi | |

* cited by examiner

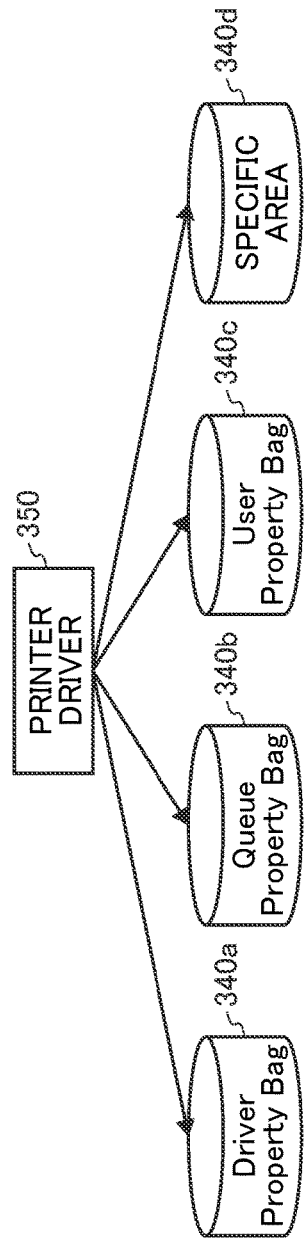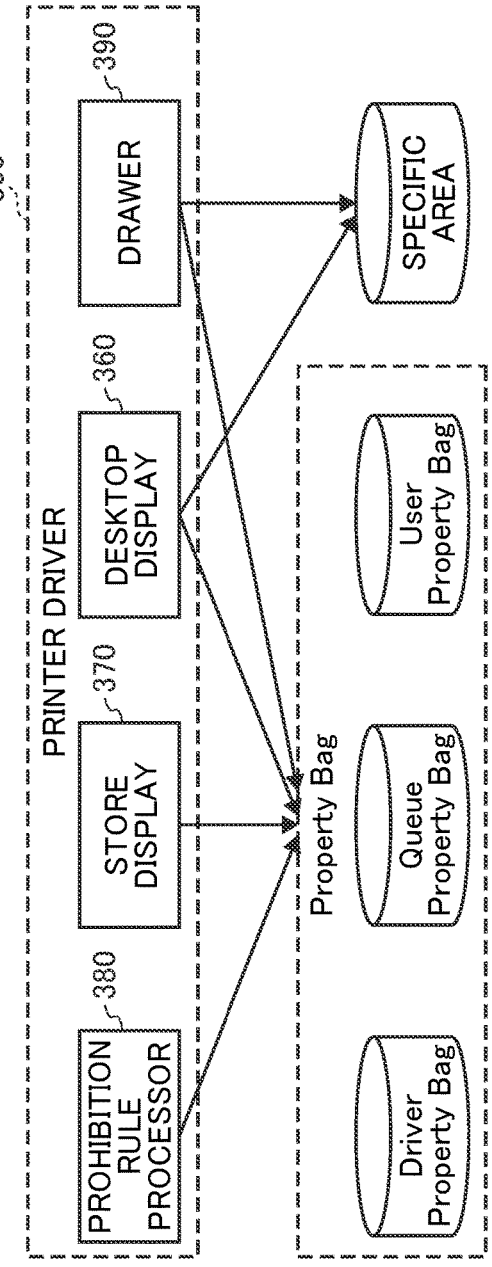

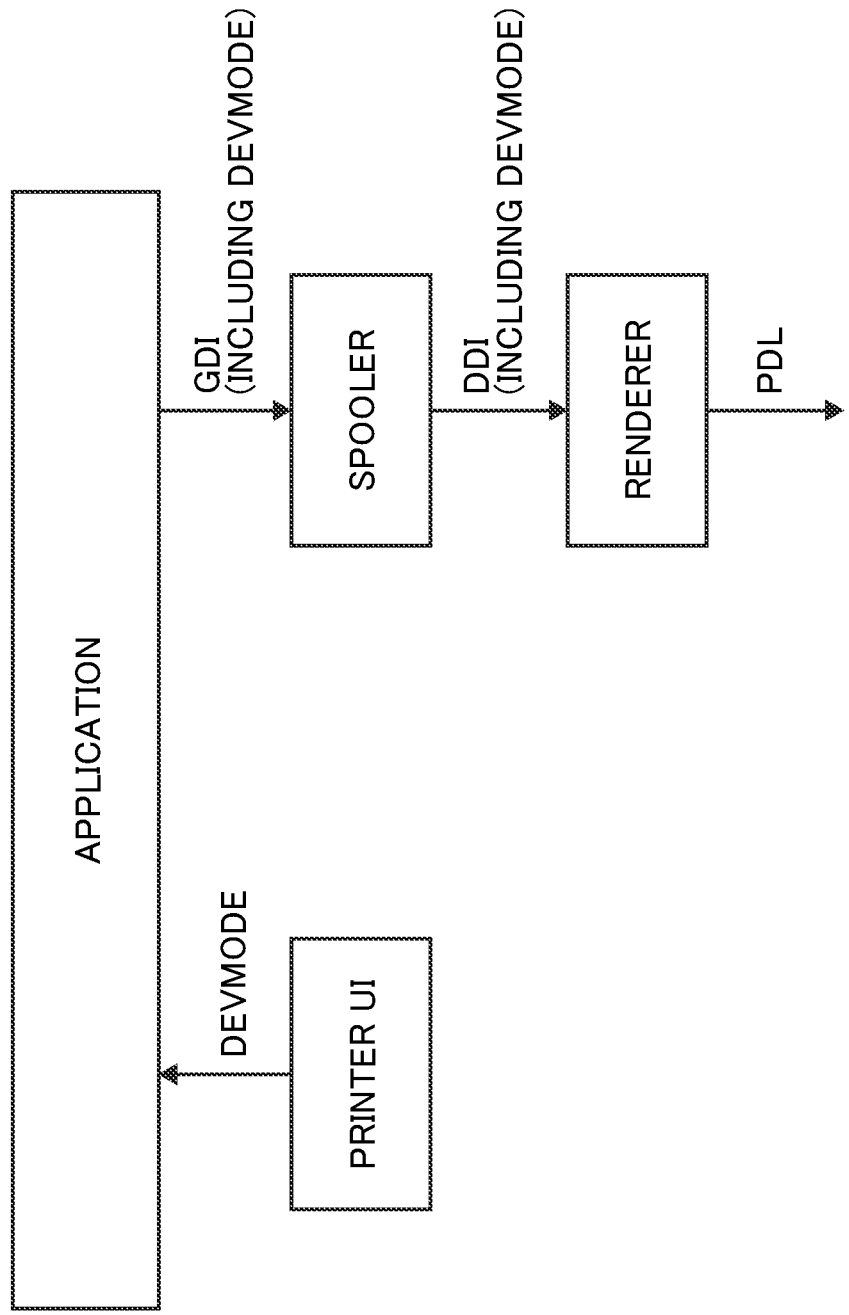

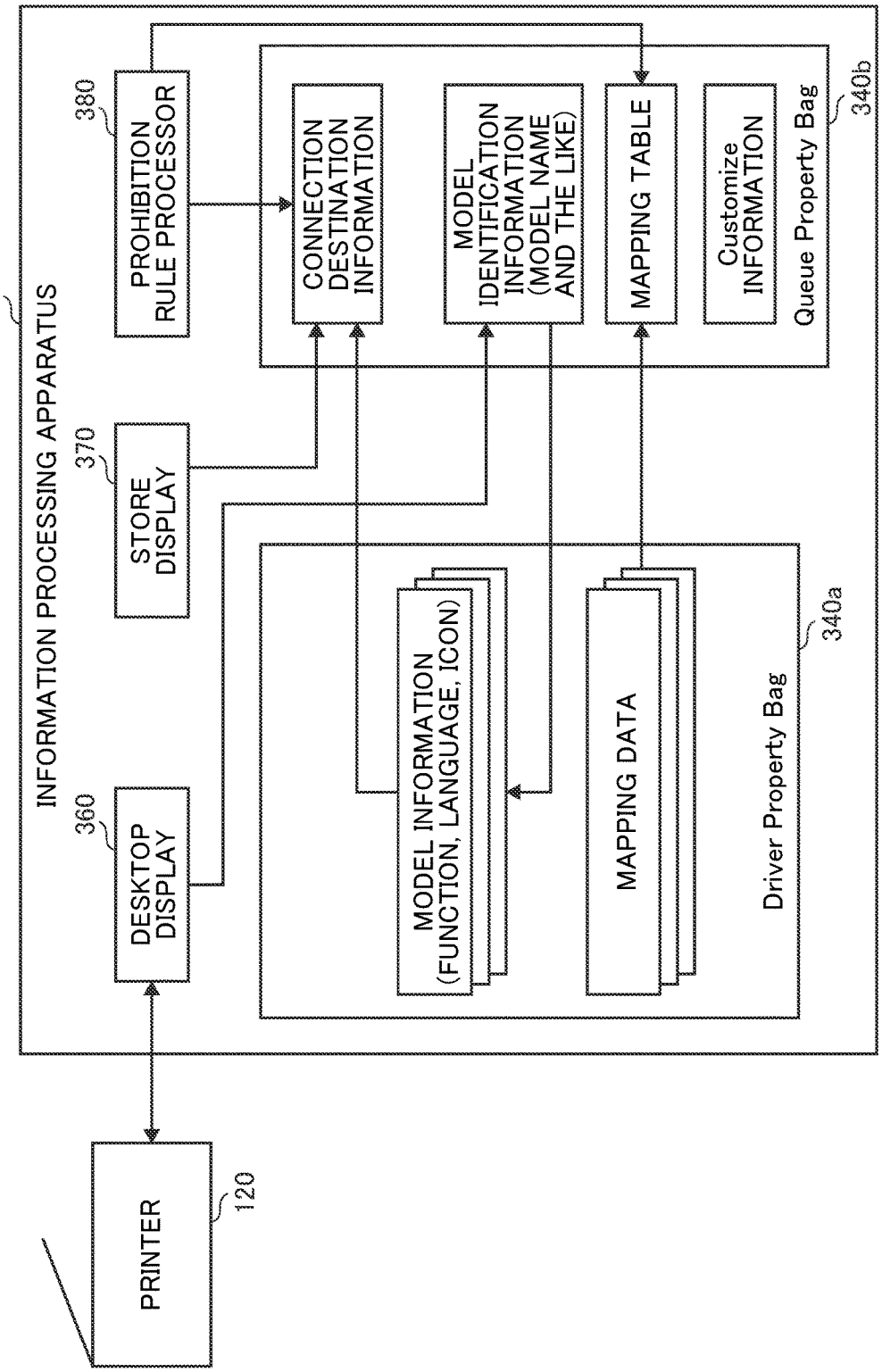

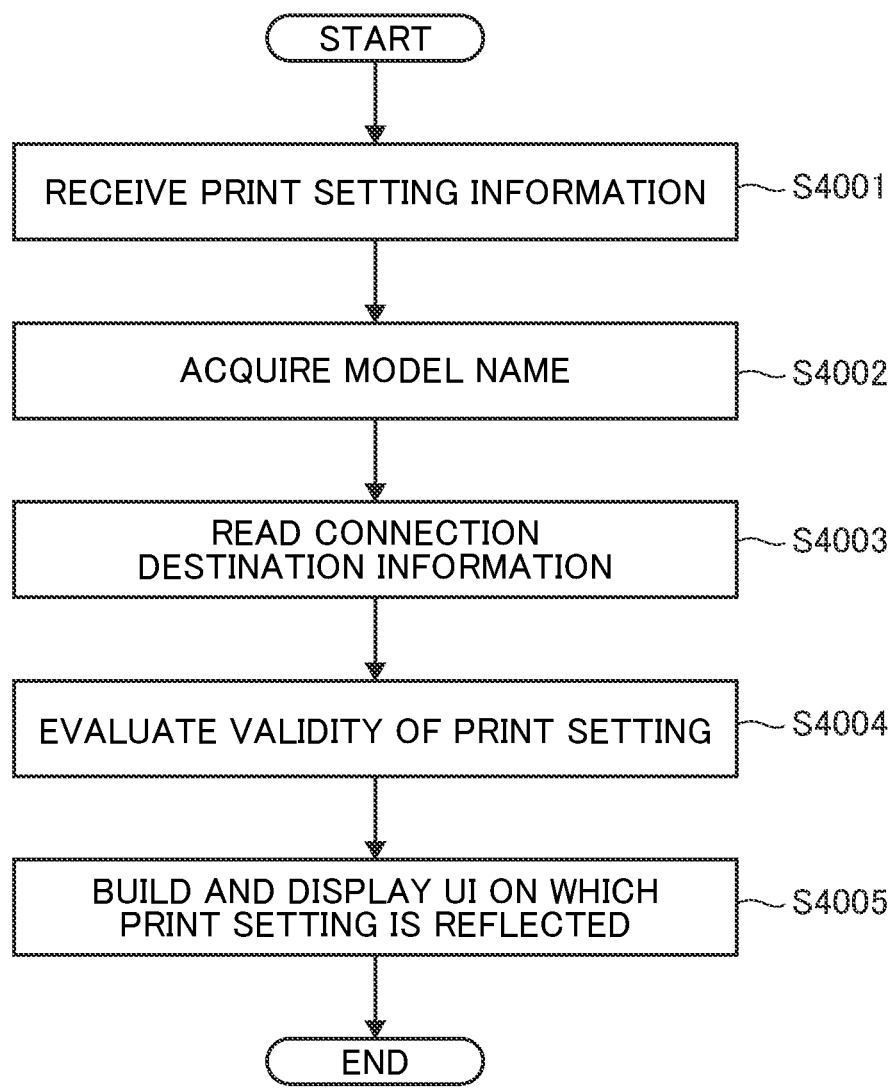

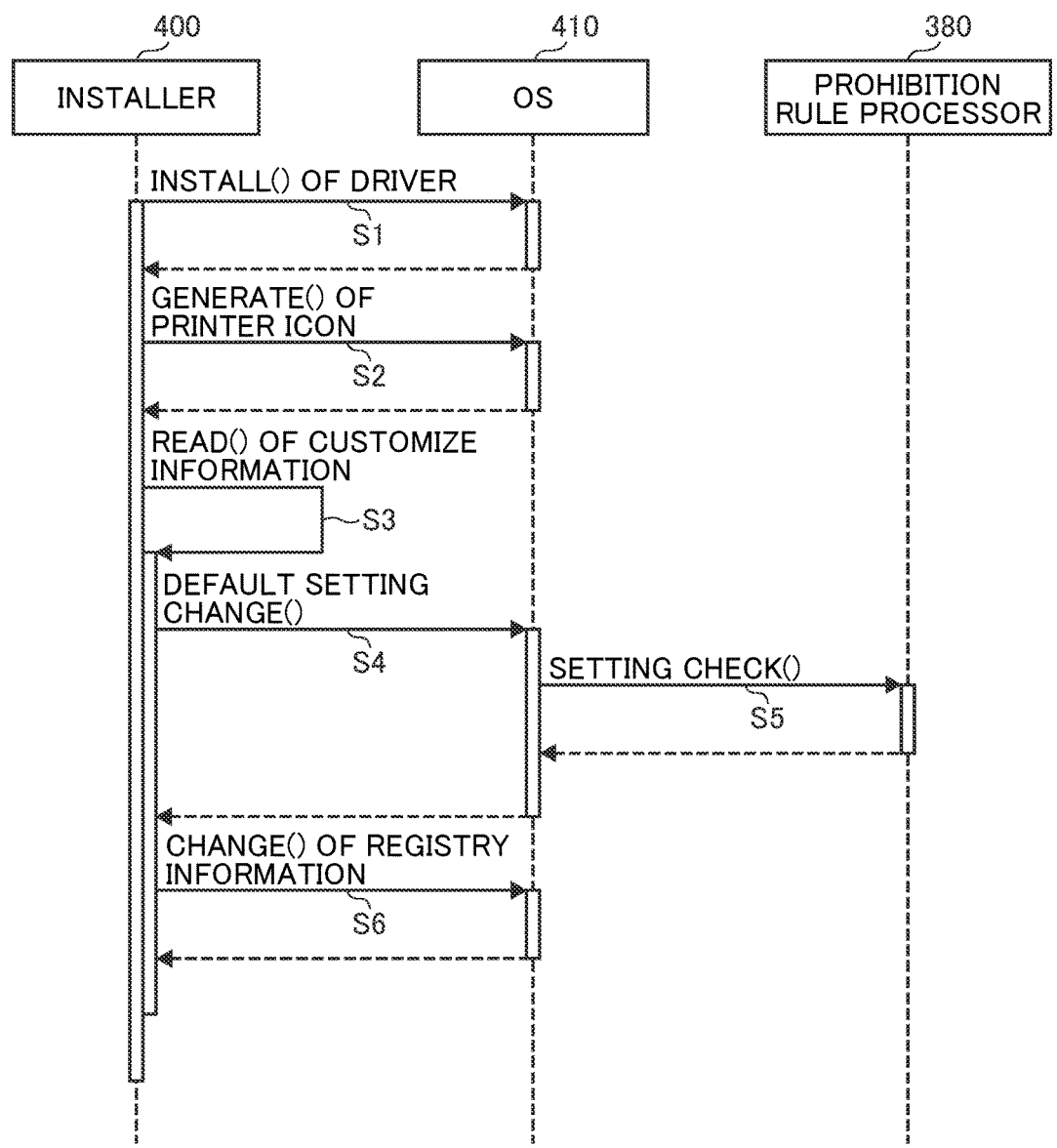

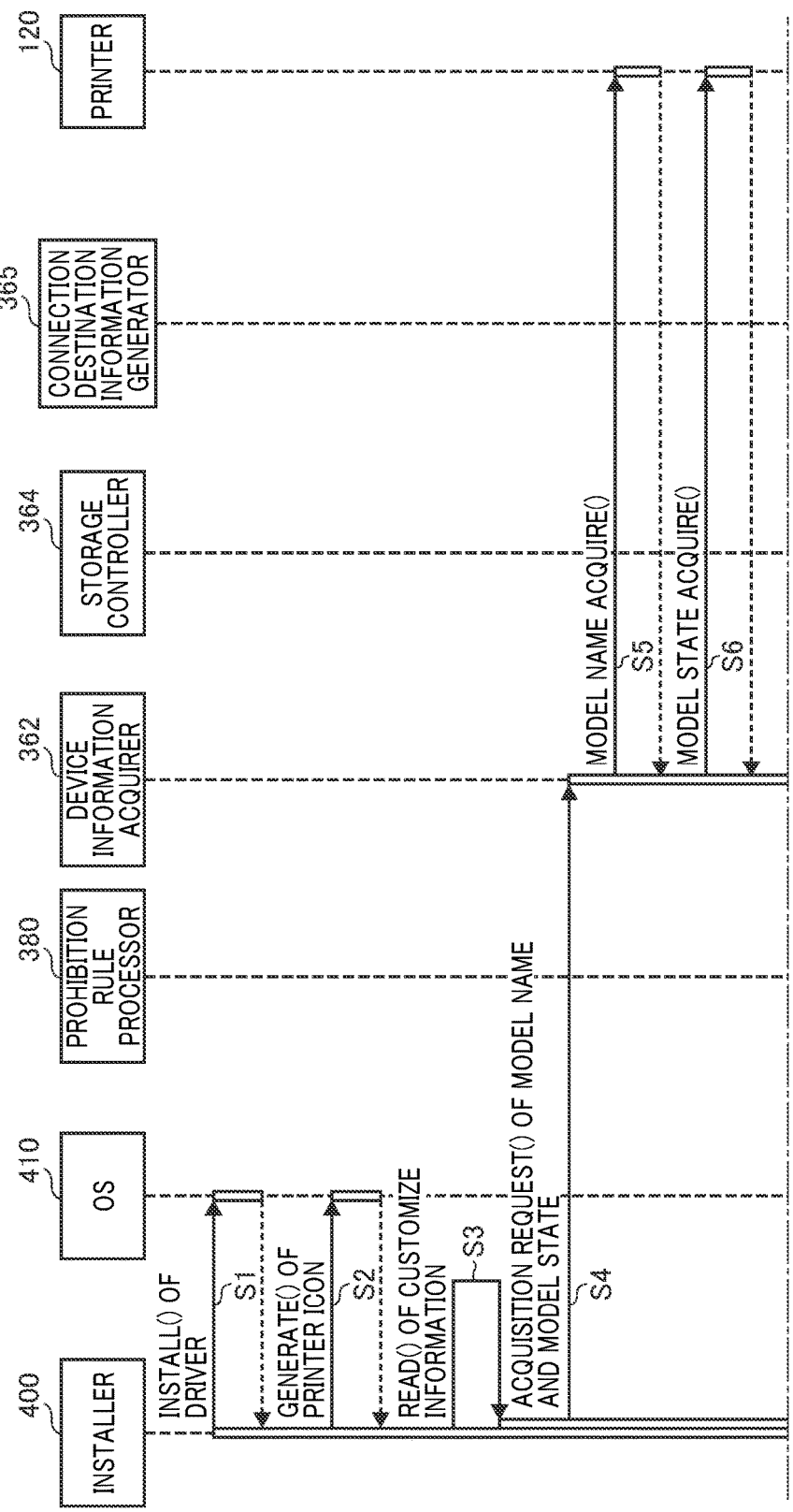

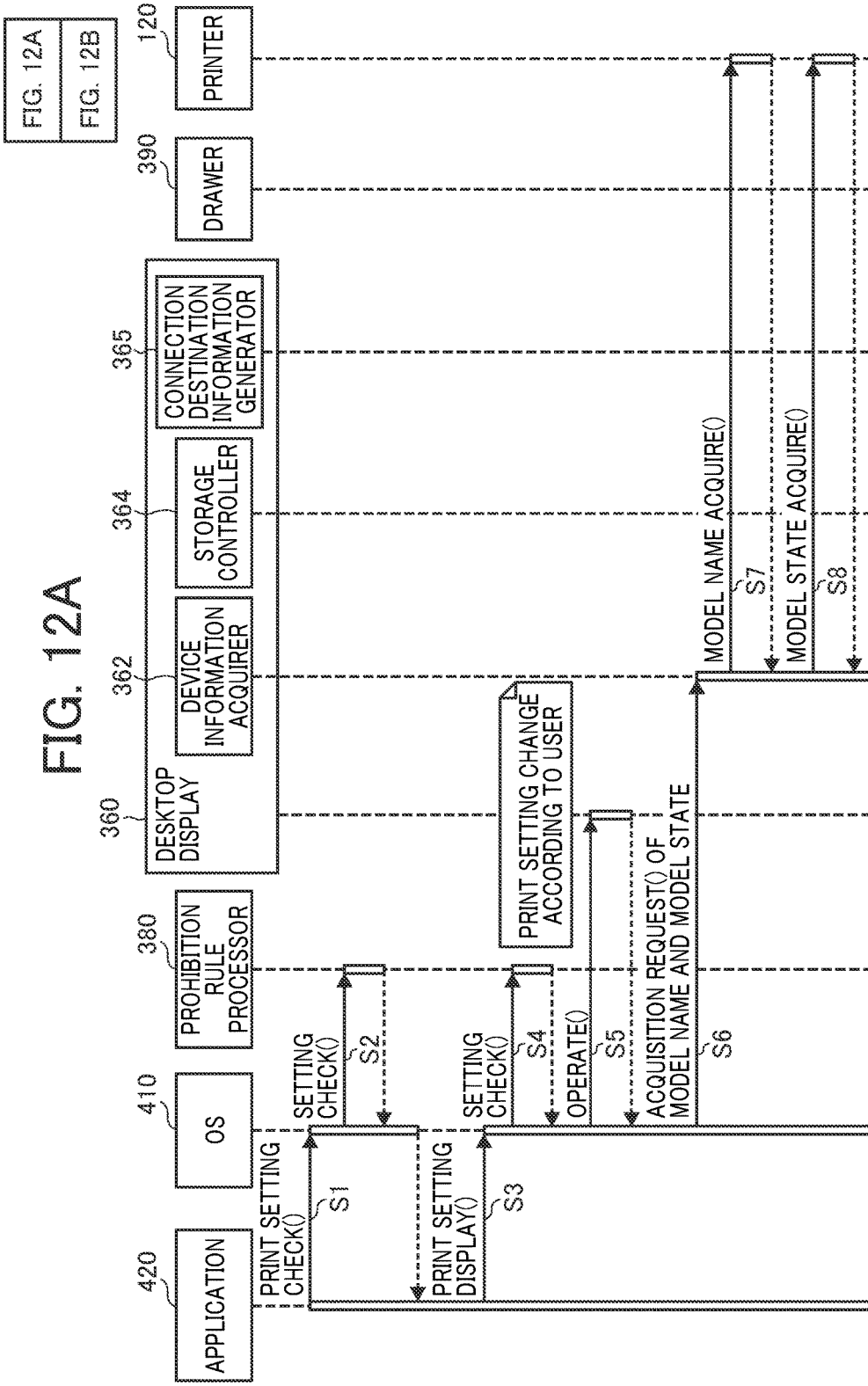

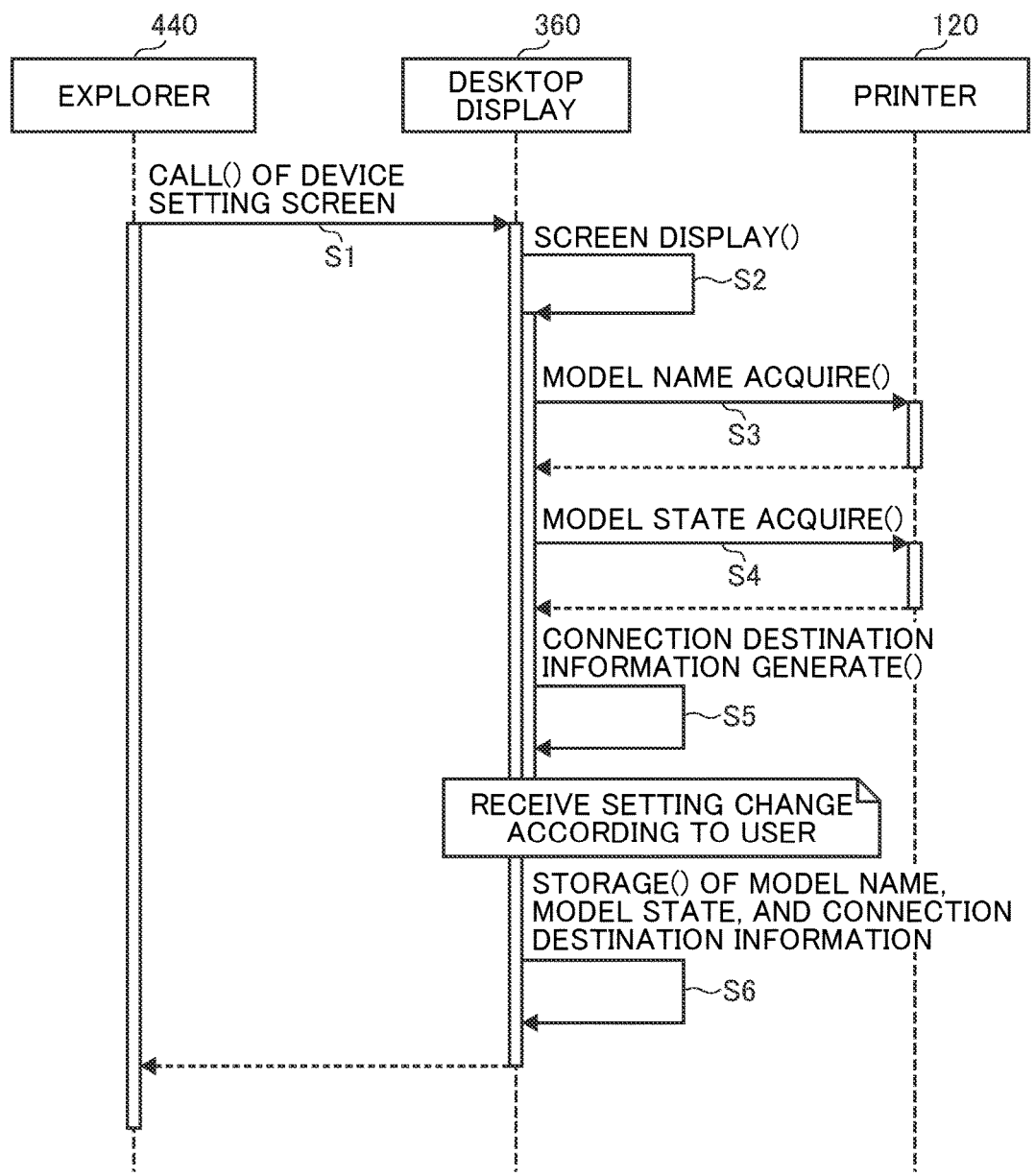

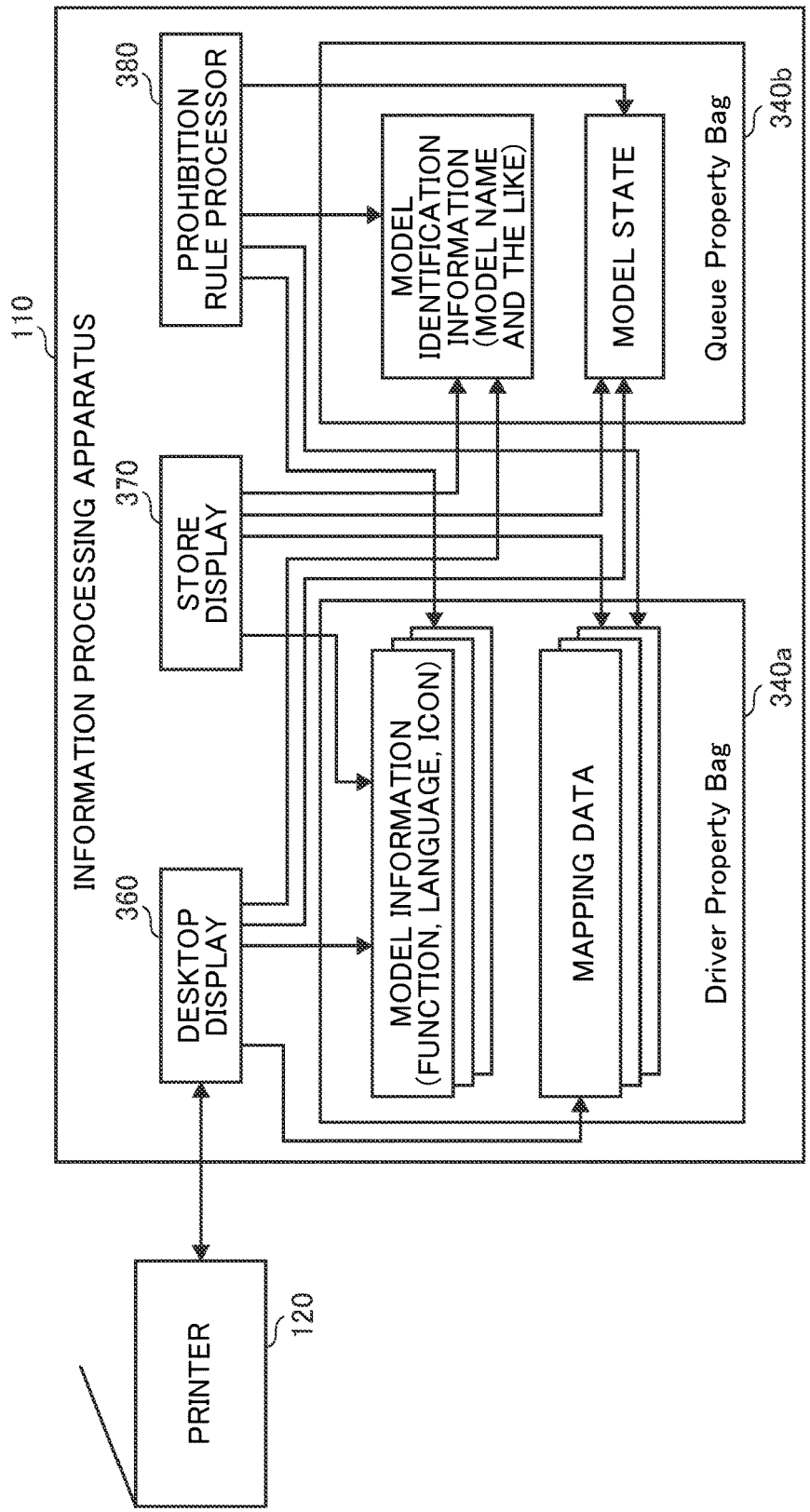

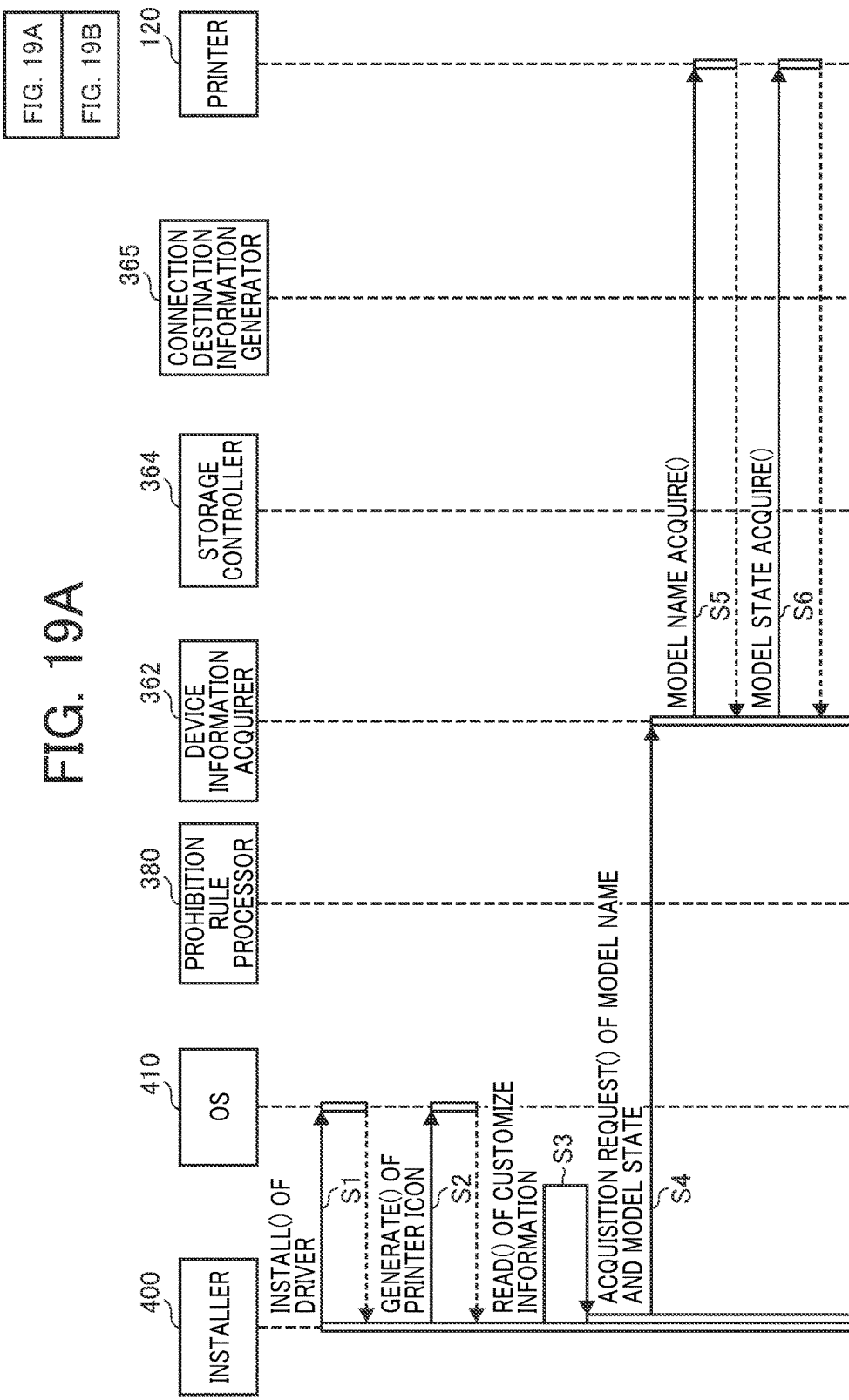

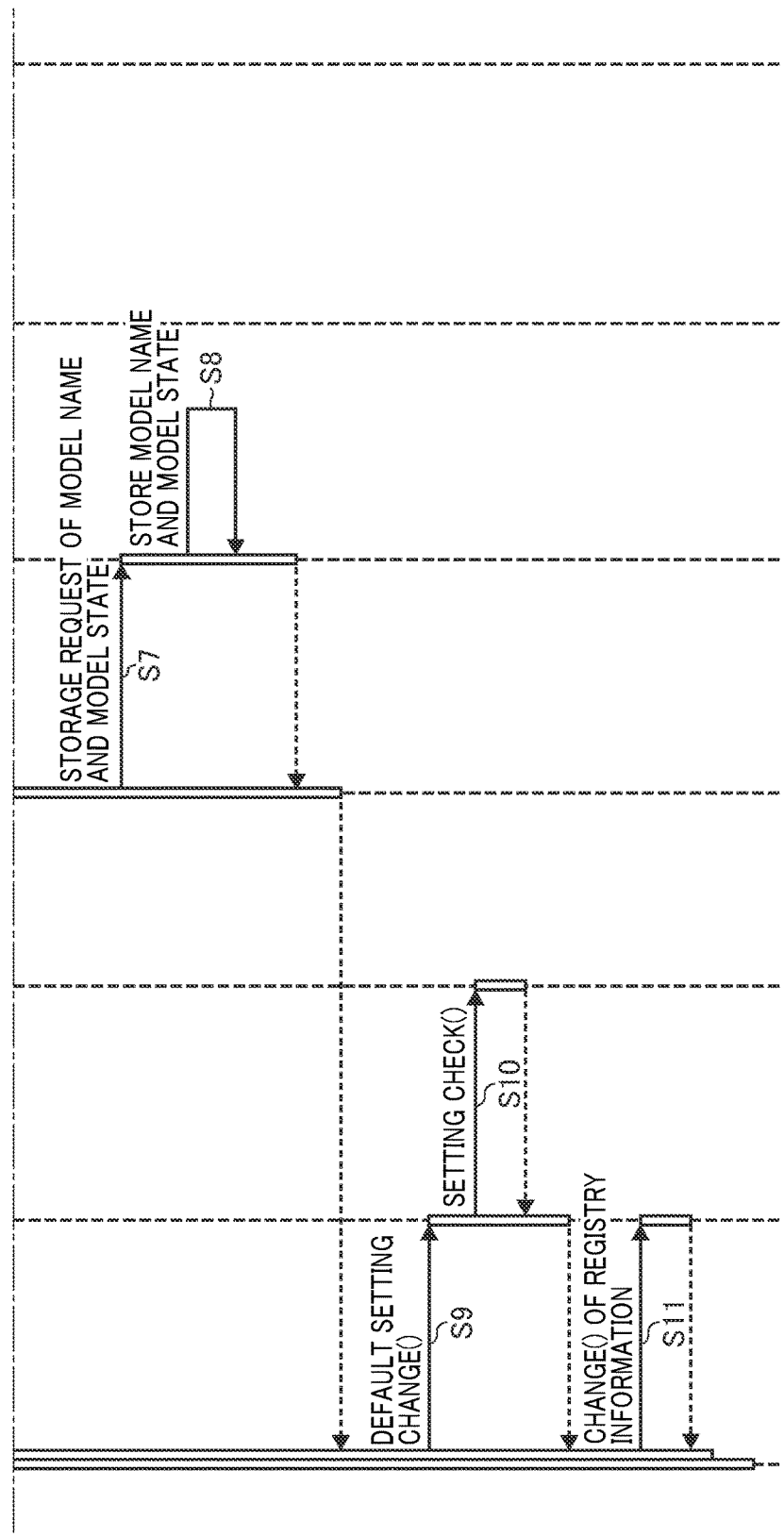

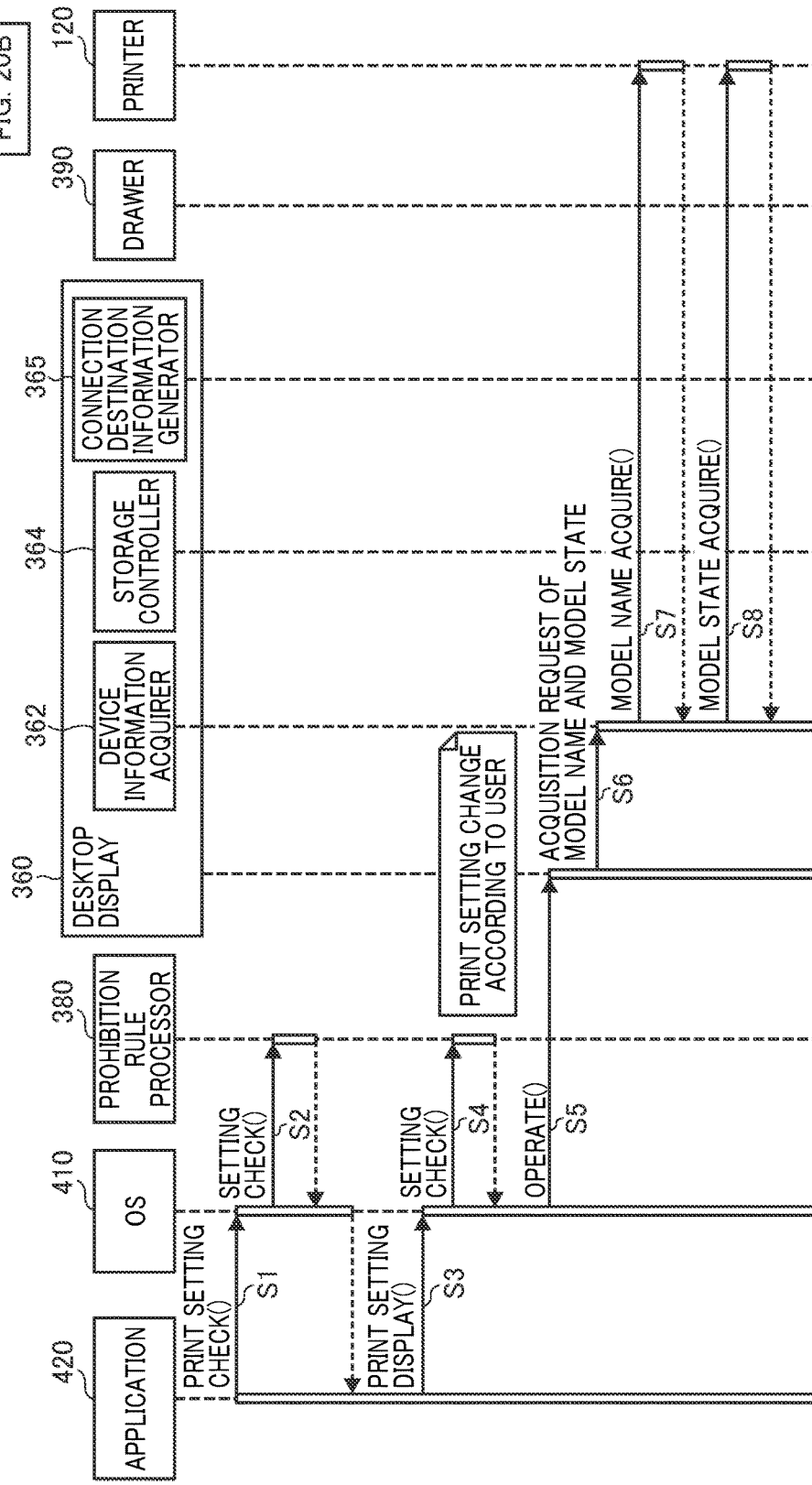

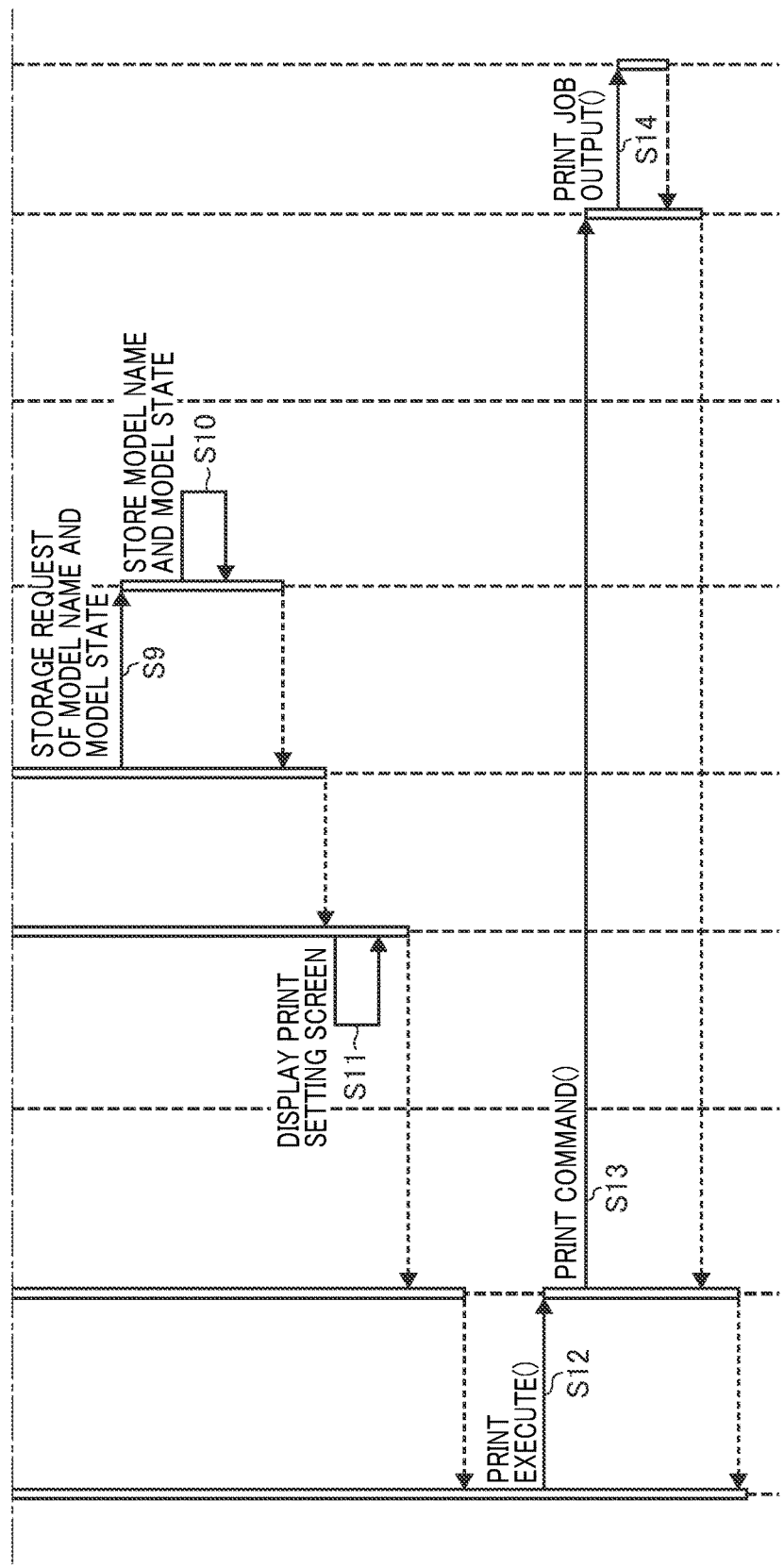

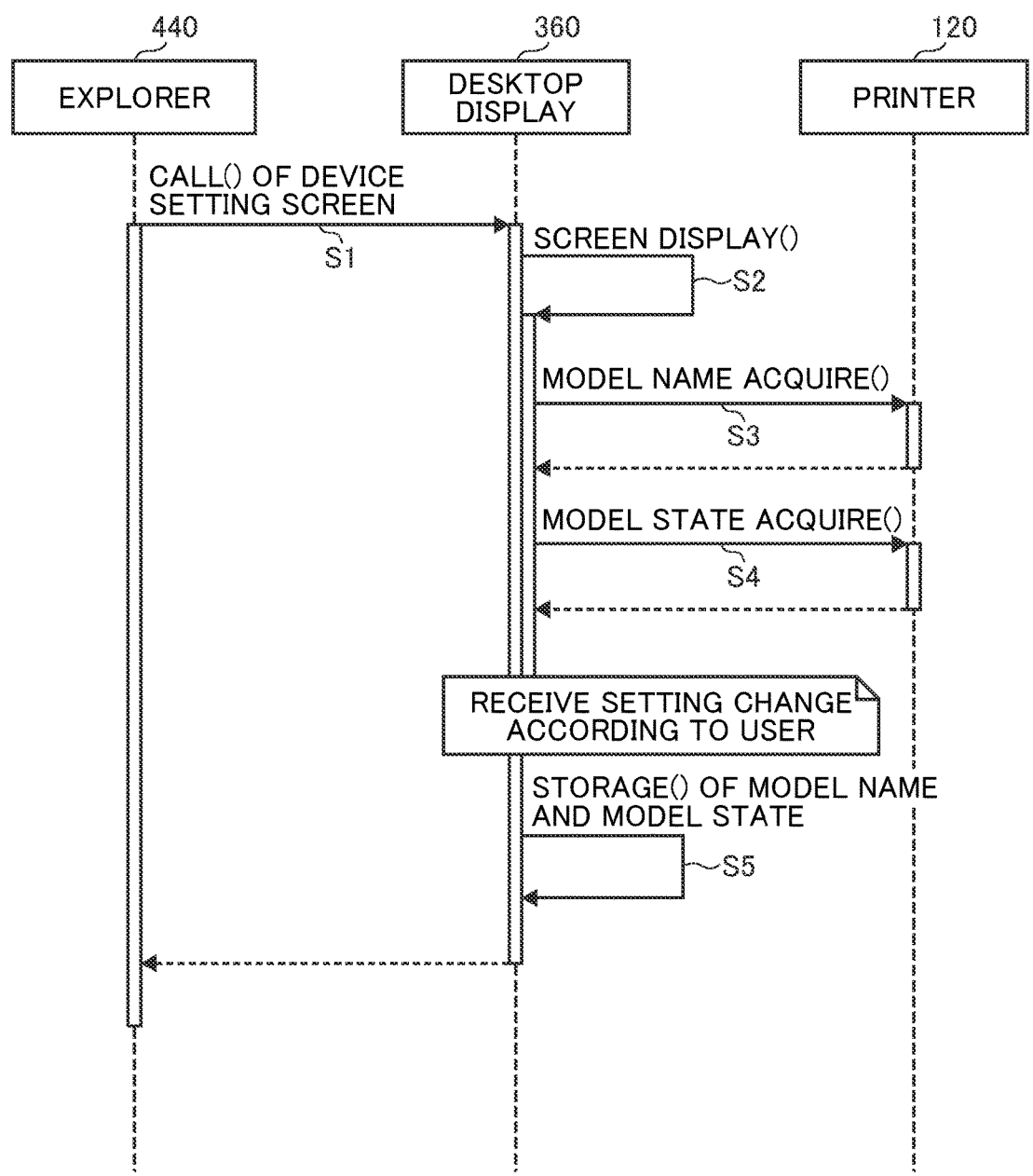

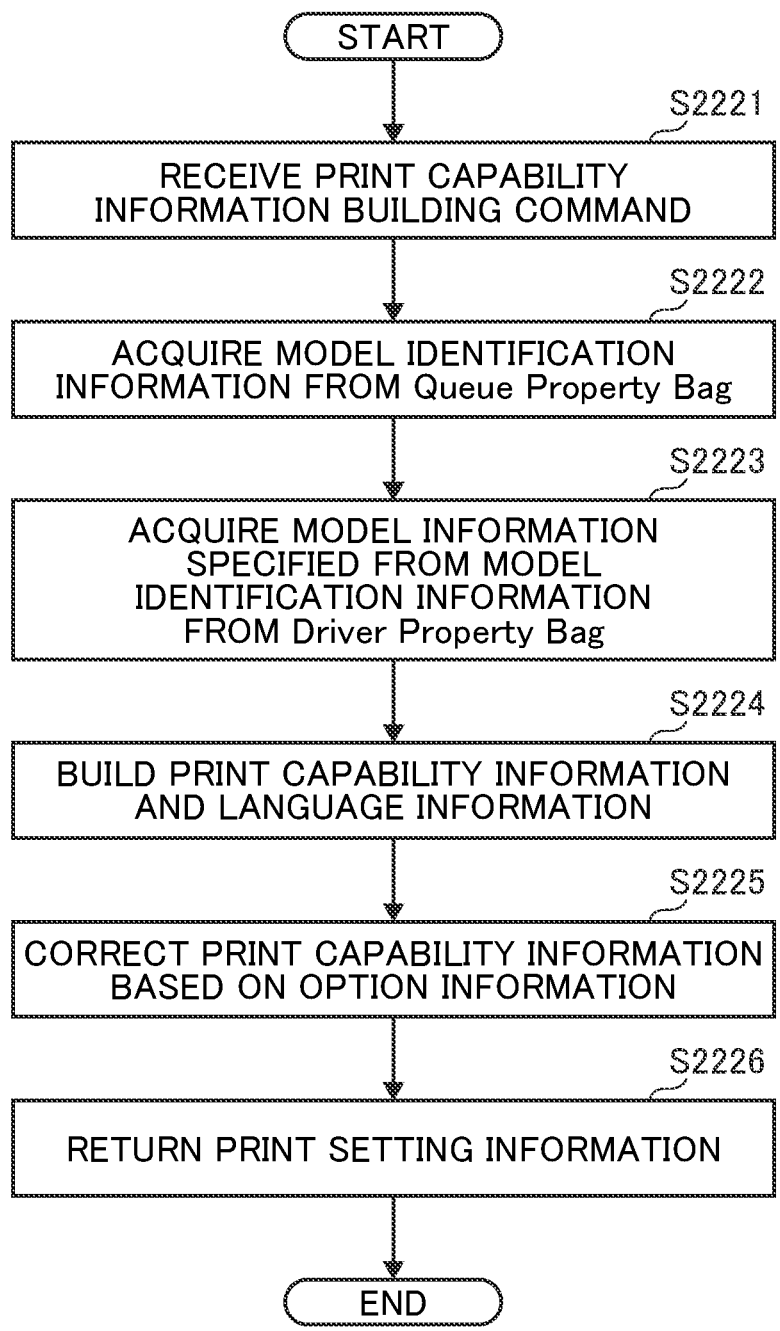

INFORMATION PROCESSING APPARATUS, IMAGE PROCESSING SYSTEM, AND PRINTER DRIVER

CROSS-REFERENCE TO RELATED APPLICATIONS

This patent application is based on and claims priority pursuant to 35 U.S.C. § 119(a) to Japanese Patent Application Nos. 2016-175789, filed on Sep. 8, 2016, 2016-228771, filed on Nov. 25, 2016, and 2017-139328, filed on Jul. 18, 2017, in the Japan Patent Office, the entire disclosure of which is hereby incorporated by reference herein.

BACKGROUND

Field of the Invention

The present invention relates to an information processing apparatus, an image processing system including the information processing apparatus, and a printer driver.

Description of the Related Art

A printer driver is mainly responsible for two roles for operating a printer connected to an information processing apparatus. The first role is to provide a user interface (UI) for allowing a user to set print settings. The second role is to convert data output from an application into data that can be analyzed by a printer based on the print settings set by the user. Accordingly, the printer can execute a print job requested from the user.

In addition, in a case where a plurality of printers of different models are connected to an information processing apparatus, by installing a printer driver at the information processing apparatus for each model, a UI corresponding to each printer is provided, and conversion into corresponding data can be performed.

SUMMARY

An information processing apparatus communicably connected with a printer, includes: a plurality of applications including at least a first application and a second application; a printer driver to control display of a screen for performing print settings for the printer, including a first module to accept a print request from the first application and a second module to accept a print request from the second application. The first module includes: an acquirer to acquire model identification information identifying a model of the printer currently connected with the information processing apparatus through a network; and a storage controller to store connection destination information according to the model of the printer in a storage area that is accessible from the second module. The second module displays a screen according to the model of the printer using the connection destination information read from the storage area.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 4A and 4B are diagrams that illustrate areas that can be accessed by a V4 printer driver and each module configuring the V4 printer driver;

FIGS. 5A and 5B are diagrams that illustrate overviews of processes of outputting a print job from a printer driver;

FIG. 6 is a diagram that illustrates the flow of data of a V4 printer driver according to a first embodiment;

FIGS. 8A, 8B, and 8C are flowcharts that illustrate processes performed by each module based on model information;

FIG. 10 is a sequence diagram that illustrates a first example of the process of installing a printer driver;

FIGS. 11A and 11B are sequence diagrams that illustrate a second example of the process of installing a printer driver;

FIGS. 12A and 12B are sequence diagrams that illustrate the whole flow of a print process using a printer driver;

FIG. 13 is a sequence diagram that illustrates the flow of a process of changing a model;

FIG. 18 is a diagram that illustrates the flow of data of a V4 printer driver according to a second embodiment;

FIG. 19 includes FIGS. 19A and 19B, which are sequence diagrams that illustrate an example of an installation process according to the second embodiment;

FIG. 20 includes FIGS. 20A and 20B, which are sequence diagrams that illustrate an example of a print process according to the second embodiment;

FIG. 21 is a sequence diagram that illustrates an example of a process of changing a model according to the second embodiment; and FIGS. 22A, 22B, and 22C are flowcharts that illustrate examples of processes performed by each module according to the second embodiment.

Figure 1:
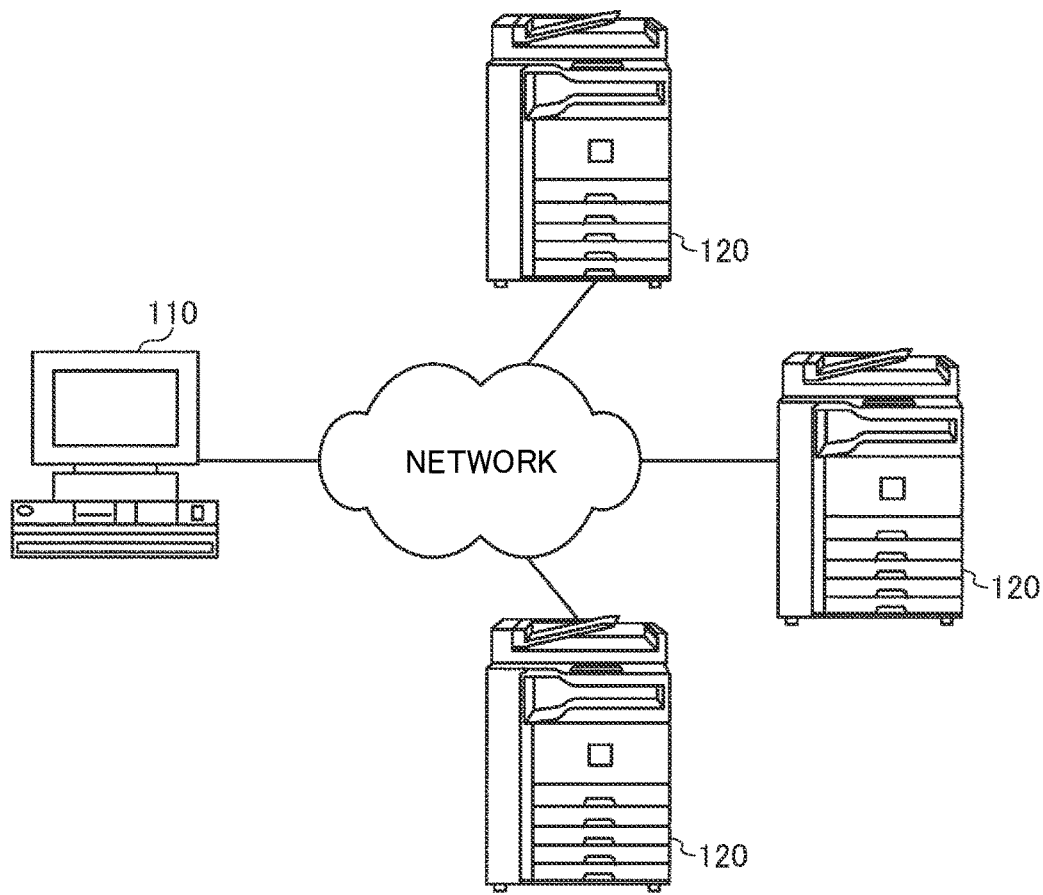
FIG. 1 is a diagram that illustrates a schematic configuration of hardware of an information processing apparatus according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION OF THE INVENTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

The printer driver has a different print architecture depending on the type and the version of an operating system (OS) of the information processing apparatus. For example, in Windows (a registered trademark; hereinafter the same) of an OS provided by Microsoft Inc., a version 3 (hereinafter, referred to as V3) printer driver is employed up to Windows 7, and, a version 4 (hereinafter, referred to as V4) printer driver in which a new architecture is introduced is employed for Windows 8 or subsequent versions.

In the V4 printer driver, a configuration corresponding to a store application, which is introduced in Windows 8, having a design that can be easily used through a touch operation is formed. For this reason, the development of a printer driver corresponding to the configuration of the V4 printer driver has progressed.

For example, in a V4 printer driver, print setting information can be efficiently edited, by maintaining model dependency information using a printer driver.

In another example, in a V4 printer driver, prohibition rule processing can be efficiently performed, by determining performing/no-performing of prohibition rule processing based on identify determination information. Here, the prohibition rule processing is a process of determining a conflict in settings of a print function.

However, due to the module configuration of the V4 printer driver, a model common driver that can be commonly used by a plurality of models while allowing a different process be performed for each model of a connection destination cannot be configured. Here, the module configurations of the V3 printer driver and the V4 printer driver will be described.

Figure 9A:
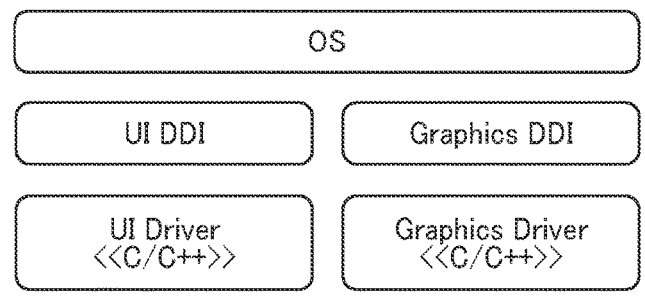
FIGS. 9A and 9B are diagrams that illustrate module configurations of printer drivers.
Figure 9B:
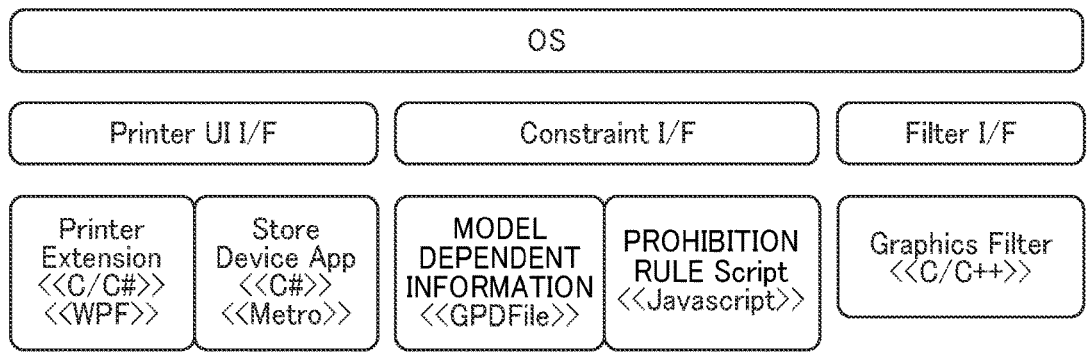

FIGS. 9A and 9B are diagrams that illustrate the module configurations of printer drivers, FIG. 9A illustrates a V3 printer driver, and FIG. 9B illustrates a V4 printer driver. Main characteristics of the V4 printer driver relative to those of the V3 printer driver are as below. While there is a difference in representations between versions, a graphics DDI and a graphics driver that are modules of the V3 printer driver and a filter I/F and a graphics filter of the V4 printer driver are respectively the same.

First, UIs according to the types of application are necessary. In the V4 printer driver, since it is necessary to cope with both a Windows store application provided by a Windows store and a desktop application that is an application other than the Windows store application, two types of UIs are necessary. Accordingly, in the configuration of the V4 printer driver, in order to display setting screens generated by the printer driver, a module (printer extension) performing a display process of a screen in a case where the printer driver is called from a desktop application and a module (store device app) performing a display process of a screen in a case where the driver is called from a store application are necessary as different modules.

Second, there are restrictions on mounted languages. The V3 printer driver can use C or C++ of a high-level language as a mounted language of a module. On the other hand, in the V4 printer driver, a mounted language is designated for each module. For example, a graphics filter that performs a process of drawing print data and the like needs to mount C or C++, and a prohibition rule script performing prohibition rule processing of print settings needs to mount JavaScript (registered trademark; hereinafter the same). According to such restrictions of mounting languages, compared to the V3 printer driver, there is a limit on a process that can be performed depending on a module.

Third, there are restrictions also on the access right of each module. There are restrictions on a module performing a process of displaying a screen according to a call from a store application and a storage area that can be accessed by the prohibition rule script is limited.

According to such a limit, a module performing the process of displaying a screen according to a call from a store application or a prohibition rule script cannot communicate with a connected printer in two ways and cannot acquire the model name of the printer. For this reason, it has been difficult to configure a model common driver that can perform a print setting based on the capability of each model.

In view of the above, according to one or more embodiments of the present invention, a model common printer driver, which can be commonly used to a plurality of models, is provided.

In the embodiments described below, while a printer driver based on the architecture of a V4 printer driver of Windows will be described as an example, the present invention is not limited to Windows or the V4 printer driver.

FIG. 1 is a diagram that illustrates a schematic configuration of hardware according to an embodiment of the present invention. FIG. 1 illustrates an example in which an information processing apparatus 110 and a printer 120 are connected through a network. In this example, while one information processing apparatus 110 and three printers 120 are connected through a network, the number of information processing apparatuses 110 may be two or more. In addition, the printers 120 are used by configuring a model common printer driver and thus, may be two or four or more printers of different models.

The information processing apparatus 110 mounts various kinds of applications and can execute such applications in accordance with a user's operation. In addition, the information processing apparatus 110 includes a printer driver corresponding to an OS and can transmit a print job to the printer 120.

The printer 120 is one of image processing apparatuses that is capable of receiving a print job from the information processing apparatus 110 through a network and executing the print job. Here, the image processing apparatus is not limited to the printer 120 but may be a multi-function peripheral (MFP) having a plurality of functions such as a copying function, a scanner function, a facsimile function, and a print function and the like. A print job is generated by a printer driver of the information processing apparatus 110 and is received in a data format described in a language that can be interpreted by the printer 120 such as a page description language (PDL), whereby the print job can be performed by the printer 120.

Figure 2:
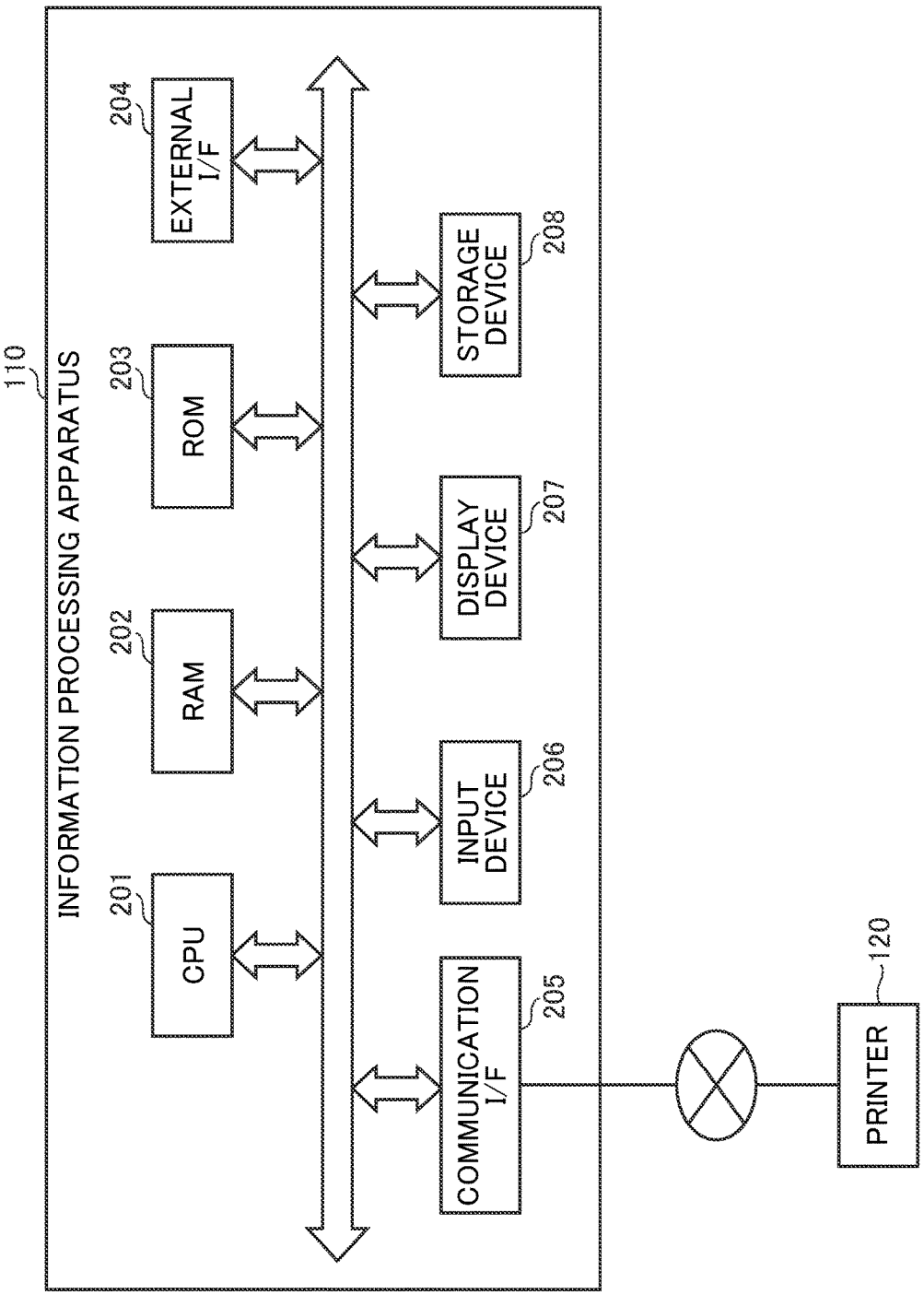
FIG. 2 is a hardware configuration diagram of the information processing apparatus according to an embodiment of the present invention.

Next, the hardware configuration of the information processing apparatus 110 will be described. FIG. 2 is a hardware configuration diagram of an information processing apparatus 110 according to an embodiment of the present invention. The information processing apparatus 110 includes a central processing unit (CPU) 201, a random access memory (RAM) 202, a read only memory (ROM) 203, an external I/F 204, a communication I/F 205, an input device 206, a display device 207, and a storage device 208, and the hardware is interconnected through a bus.

The CPU 201 is a device that executes a program controlling the operation of the information processing apparatus 110. The RAM 202 is a volatile storage device used for providing an execution space of a program executed by the information processing apparatus 110 and is used for storing or expanding the program or data. The ROM 203 is a nonvolatile storage device used for storing a program such as firmware executed by the information processing apparatus 110.

The external I/F 204 is an interface used for connecting an external storage medium or the like such as a flash memory to the information processing apparatus 110. The communication I/F 205 is an interface used for connecting the information processing apparatus 110 and a network in a wired manner or a wireless manner. In addition, the communication I/F 205 is also used when a print job is transmitted to the printer 120.

The input device 206 is a device that receives an operation input by a user and, for example, a keyboard, a mouse, or the like. The display device 207 is a device used for displaying information for a user and, for example, is a liquid crystal display or the like.

The storage device 208 is a storage medium from/to which information can be read or written and can store an OS operating the information processing apparatus 110, a printer driver, various applications, and the like.

Figure 3:
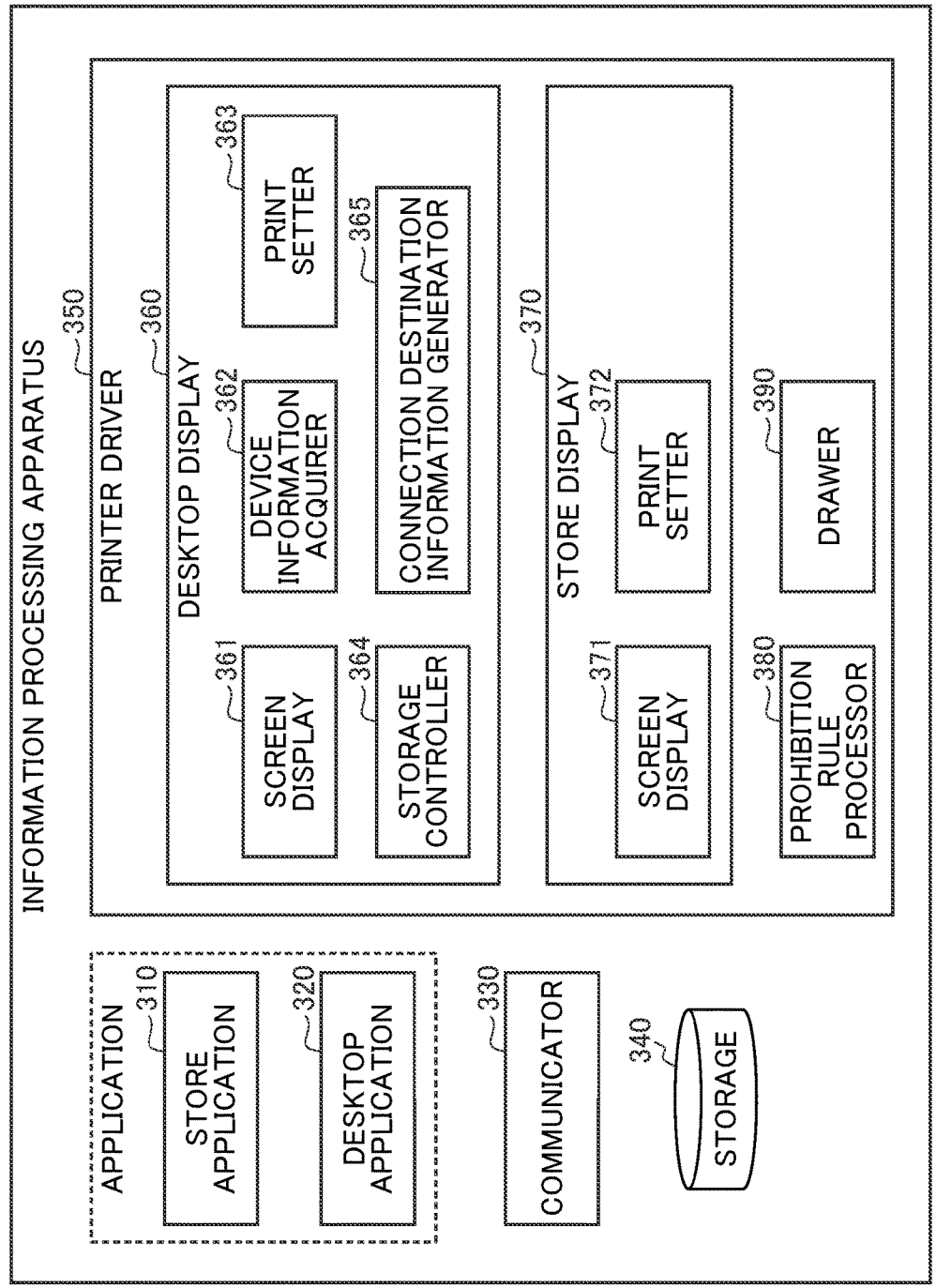
FIG. 3 is a software block diagram of an information processing apparatus according to an embodiment of the present invention.

As above, the hardware configuration included in the information processing apparatus 110 has been described. Next, functional units realized by software cooperating with the hardware of the information processing apparatus 110 described above will be described. FIG. 3 is a software block diagram of the information processing apparatus 110 according to an embodiment of the present invention. Here, a printer driver 350 will be described to include the functional units.

The information processing apparatus 110 includes an application, a communicator 330, a storage 340, and the printer driver 350. As types of application, there are two types including a store application 310 and a desktop application 320.

The store application 310 is an application provided by a Windows store among applications and, for example, is an application displayed in an UI called a metro style in Windows 8. The metro style is an easy-to-understand design having a subway (metro) and a sign as its motives and is in the form corresponding to a touch operation. In addition, the store application 310 can generate a file that is a print target. Furthermore, the store application 310 is configured to be a sandbox by the OS for the improvement of security and stability. In other words, the store application 310 can operate a program only within a protected area.

The desktop application 320 is an application other than the store application 310 among applications and that can operate a program also outside a protected area. The desktop application 320, similar to the store application 310, can generate a file that is a print target. Examples of the desktop application 320 include document creating software such as Microsoft Word (registered trademark), spreadsheet software such as Microsoft Excel (registered trademark), and the like.

The communicator 330 is a unit that performs transmission/reception of information between the information processing apparatus 110 and the printer 120 through the communication I/F 205 such as acquisition of model identification information or transmission of a print job. Here, the model identification information is information used for specifying the model of the printer 120 that is the current connection destination. As an example of the model identification information, there is a model name, and the model name will be described as an example of the model identification information in description presented below.

The storage 340 is a unit that stores various kinds of information such as model information, language information, and setting information. Here, the model information is information representing the capability included in each model such as functions, and a plurality of pieces of model information are stored in the storage 340 for each model. In the storage 340, various storage areas according to access rights are present, and the access right for each storage area is different for each module. Details of the storage areas included in the storage 340 will be described later.

The printer driver 350 is a driver used for controlling the printer 120 and is a unit that generates print image data or displays a screen of print settings. The printer driver 350 includes a desktop display 360, a store display 370, a prohibition rule processor 380, and a drawer 390 as the modules (functional units) described above.

The desktop display 360 is a module that corresponds to the printer extension illustrated in FIG. 9B. The desktop display 360, for example, accepts a request for printing from application software other than the store application 310, in other words, the desktop application 320, displays a screen used for performing print settings, and generates print setting information. Here, the screen is a print setting screen for receiving print setting information, an option screen used for setting and checking options of the printer, and the like. The printer extension displays a vendor-specific print setting screen in a desktop UI of the V4 printer driver.

The desktop display 360 includes various functional units including a screen display 361, a device information acquirer 362, a print setter 363, a storage controller 364, and a connection destination information generator 365 and stores the model name in an area that can be accessed from the other modules, at least the store display 370 and the prohibition rule processor 380 by using such functional units. The desktop display 360 of the V4 printer driver is described in a high-level language, and accordingly, there is no restriction on a process to be executed, and there is no limit on an area that can be accessed.

The screen display 361 is a unit that displays a screen according to the model of the printer 120 and displays a screen used for the desktop application 320. In addition, the screen display 361 can control a display screen such that a set value that can be set is input based on connection destination information to be described later.

The device information acquirer 362 is a unit that acquires various kinds of information of the model name of a device that is currently connected and the states (option information relating to options attached to the device, the size of a sheet inserted into each tray, and the like) of the device through two-way communication with the printer 120. The model name and the like that have been acquired are stored in an area that can be accessed by any module of the storage 340. In this way, as the desktop display 360 acquires the model name and the like and stores the model name and the like in an area that can be accessed by any module, the store display 370 can acquire the model name and the like, collect necessary information from the model name and the like that have been acquired, and configure a model common driver.

The print setter 363 is a unit that generates print setting information (print ticket) based on various kinds of setting information input by a user. In addition, the print setter 363 can perform print settings corresponding to the capability of the model of the printer 120 that is currently connected based on the print capability information (print capability). Here, the print setting information is information that represents a current print setting value in each setting item set for printing. The setting items, for example, are items such as a sheet size and a print orientation, and the print setting value is information representing the sheet size to be A4 and the print orientation to be vertical (portrait). In addition, the print capability information represents a list of setting items that can be set and is information representing usable functions used for display of options and the like. The print capability information, for example, is information of an option representing a size A4 or a size B5 in a case where the printer 120 can perform printing for the sizes A4 and B5.

The storage controller 364 is a unit that controls writing of the acquired model name, the generated connection destination information, mapping information (for example, a mapping table) specified from the model name, encryption information, and the like into an area of the storage 340 from which the store display 370 and the prohibition rule processor 380 can read (can access) information. Details of the mapping table will be described later. An example of the area from which the store display 370 and the prohibition rule processor 380 can read information includes a queue property bag.

The connection destination information generator 365 is a unit that generates connection destination information. The connection destination information is model information of a model of a printer 120 that is currently connected and is generated in a format that can be read by the store display 370 and the prohibition rule processor 380. The connection destination information may be the model information described above or simplified version model information in which extra information is omitted. In addition, the connection destination information generator 365 may generate information relating to a connection destination such as mapping information and encryption information in addition to the connection destination information.

The model information includes functions included for each model, options that can be mounted, a setting file in which a relation between functions or a function and an option is defined, and a language file. This setting file is defined in a format such as an extensible markup language (XML) or a JavaScript object notation (JSON). The language file is similarly defined. In addition, icons displayed on a print setting screen or a device setting screen are defined in a format such as a BMP or portable network graphics (PNG). The simplified version model information is acquired by removing extra information from the model information defined in the format of the XML or the JSON and performing a conversion into a simple format that can be processed by the prohibition rule processor 380. In other words, the simplified version model information is simple connection destination information, which is generated only from information used for displaying the print setting screen by the store display 370, having a decreased information amount.

For example, it is assumed that there is a portion in which the operation is changed according to an option in a same model. In this case, in the XML, an operation A is described to be executed in the case of an option 1, and an operation B is described to be executed in the case of an option 2. In a case where option information is acquired, and it is checked that the option is the option 1, the description of the operation of the option 2 is unnecessary in the simplified version model information. Accordingly, the unnecessary portion is removed, and only description of the operation of the option 1 used for displaying the print setting screen is formed.

The generated connection destination information is stored in an area of the storage 340 from which the store display 370 and the prohibition rule processor 380 can read information. In addition, in a case where the connection destination information is configured as simplified version model information, the amount of information to be stored is small, and, when a conversion into a format that can be easily accessed from the store display 370 or the prohibition rule processor 380 is performed, the connection destination information can be easily converted, which is desirable.

The store display 370 is also called a store device application, corresponds to the store device application illustrated in FIG. 9B, and is downloaded from a Windows store as one application. The store display 370 accepts a print request from the store application 310, displays a screen used for performing print settings, and generates print setting information. The process of displaying the screen and the generation of the print setting information are similar to the process and the generation of the desktop display 360. The store display 370 includes various functional units of a screen display 371 and a print setter 372.

The store display 370 depends on the limit of the Windows store applications and thus, can access only a property bag such as the queue property bag described above but cannot access an external resource. The reason for this is that, in order to secure the security and the stability, the Windows store application is configured as a sand box by the OS and is guarded by the OS side. Accordingly, the store display 370, in a process of accessing a component other than the sand box, cannot use a file access application programming interface (API) that is necessary for the printer driver, a network communication API, and the like. For this reason, the store display 370 cannot acquire the model name of a printer that is currently connected through two-way communication and the like.

The screen display 371, similar to the screen display 361 of the desktop display 360, is a unit that displays a screen according to the model of the printer 120 and displays a UI corresponding to a metro style used for a store application.

The print setter 372, similar to the print setter 363 of the desktop display 360, is a unit that generates print setting information (print ticket) based on various kinds of setting information input by a user.

The prohibition rule processor 380 corresponds to the prohibition rule script illustrated in FIG. 9B and is a unit that performs a process relating to print settings without accompanying the display of a screen. The process relating to print settings, for example, in a case where a print setting is accepted by an application, is a process of returning print capability information in response to a request from the application or determining the consistency, the validity, or the like representing whether print setting information generated by the application is a settable value.

As a more specific example of the prohibition rule process, there is a process in which, in a case where stapling is selected in a finishing function of the printer 120, punching cannot be performed. By performing such a prohibition rule process, a process of which the compatibility is difficult to consider can be excluded, and an appropriate print setting can be performed.

In addition, also in the prohibition rule processor 380, various restrictions are present, and, similar to the store display 370, only an access to the property bag can be made, but an access to an external resource cannot be made. The reason for this is that a file access API and a network communication API are guarded on the OS side. In addition, since the mounting language of the prohibition rule processor 380 is only a script (for example, JavaScript) having a limited use, only a simple process is performed, but a complicated process as in a high-level language cannot be performed. In addition, since a script is arranged in the system as it is at the time of installing the printer driver 350, there are cases where the processing content is read from the outside. As the processing content, for example, there is association (mapping) between a function and print setting information or print capability information. Thus, by hiding this mapping or the like, the security can be improved. A method for improving the security of the prohibition rule processor 380 will be described later.

The drawer 390 corresponds to the graphics filter illustrated in FIG. 9B and is a unit that generates drawing data of a format that can be interpreted by the printer 120 based on the print settings and outputs the generated drawing data to the printer 120 as a print job. The drawing data, for example, is output in a data format such as a PDL. Similar to the desktop display 360, the drawer 390 has no restriction on the process to be executed and has no limit on an area to be accessed.

Here, while all the functional units are realized by executing software, the realization is not limited to the software, but some or all of the functional units may be mounted as hardware providing equivalent functions.

Meanwhile, while a plurality of storage areas are present in the storage 340, a right for accessing each area is different for each module of the V4 printer driver. Thus, next, an area that can be accessed by the V4 printer driver in the software block described above will be described. FIGS. 4A and 4B are diagrams that illustrate areas that can be accessed by a V4 printer driver and each module configuring the V4 printer driver. FIG. 4A illustrates areas that can be accessed by the V4 printer driver, and FIG. 4B illustrates areas that can be accessed by the modules of the V4 printer driver.

As illustrated in FIG. 4A, the V4 printer driver can access various storage areas included in the storage 340. In the storage 340, a driver property bag 340a, a queue property bag 340b, a user property bag 340c, and a specific area 340d are included as storage areas. In addition, among the storages 340, the driver property bag 340a, the queue property bag 340b, and the user property bag 340c are storage areas defined by the OS in advance as storage areas in which the V4 printer driver maintains data.

The driver property bag 340a is an only-readable area, and a configuration file of each printer driver is stored. The configuration file is information used for building model information and, examples of the configuration file include model common information, model specific information, and language information. The information included in the configuration file is determined until when the printer driver 350 is packaged. A printer driver package may include control files used for performing installation or uninstallation and the like in addition to files that are necessary for realizing the functions of the printer driver 350.

The model common information and the model specific information are setting items, prohibition rule information relating to setting items that cannot be simultaneously set, display of a print setting screen, information used for generating print setting information, and the like. Here, the model common information is information not depending on the model of the printer 120, and the model specific information is information depending on the model of the printer 120. Examples of the setting items include an aggregation setting, option information, and a finishing function. The information relating to the aggregation setting is included in the model common information, and the option information and the information relating to the finishing function are included in the model specific information.

The language information is acquired by storing a display name of a setting item for each language, and, for example, as a finishing function performing stapling, Japanese "stapling" and English "stapling" are associated with each other to be stored.

The queue property bag 340b is a readable and writable area. For the queue property bag 340b, while reading from each module can be performed, writing depends on the right of a supervisor or the like. The desktop display 360 can store information for each printer icon in the queue property bag 340b and generates and maintains the information of a model of the printer 120 that is currently connected. As the printer icon, two or more icons may be generated for the same printer 120. For this reason, the desktop display 360 can generate different information for each of two or more icons of the same printer.

In the queue property bag 340b, a model name and option information acquired by the desktop display 360, for example, through two-way communication, model switching according to a user's operation, or the like are stored. The information to be stored is converted into a format that can be processed by the store display 370 and the prohibition rule processor 380 and stored by the desktop display 360.

By storing information as described above, the store display 370 and the prohibition rule processor 380 can access the queue property bag 340b, and accordingly, the model specific information of the model that is currently connected can be specified based on the stored model name. For this reason, by combining the model common information and the specified model specific information, a model common printer driver can be configured.

In addition, in the queue property bag 340b, connection destination information generated by the connection destination information generator 365 can be stored. It is preferable that this connection destination information is in a format that can be processed using a script language so as to be executed by the prohibition rule processor 380. The reason for this is that the efficiency is low in a case where the combining process described above is performed whenever each module performs the process, and there is no limit on the process in the desktop display 360, compared to the prohibition rule script, and accordingly, the desktop display 360 can efficiently perform the process more than the other modules. Accordingly, as the desktop display 360 converts information in the format that can be processed by the prohibition rule processor 380 and the store display 370 and stores the converted information, an efficient process can be performed.

In this way, as the desktop display 360 stores a model name in an area that can be accessed by other modules such as the queue property bag 340b and the like, a model common driver can be configured.

The user property bag 340c is an area in which information is stored for each printer icon or each user and is a readable and writable area, but information of other users cannot be accessed. The user property bag 340c is not limited to the storing of information for each printer icon or each user but may store information for each printer icon and each user. In this way, also in a case where the same printer is used, a usable function can be changed for each user. In addition, in the user property bag 340c, for example, a print setting having a high use frequency may be stored as a "favorite".

The specific area 340d is an area in which a file, registry information, and the like are stored in an area in which information can be stored in a vendor-specific format by the desktop display 360.

For the storage areas described above, as illustrated in FIG. 4B, the access right is different for each module. FIG. 4B illustrates the modules of the V4 printer driver in detail and illustrates areas that can be accessed by each module of the prohibition rule processor 380, the store display 370, the desktop display 360, and the drawer 390.

As illustrated in FIG. 4B, the driver property bag 340a, the queue property bag 340b, and the user property bag 340c can be accessed from each module. On the other hand, modules that can access the specific area 340d are limited to the desktop display 360 and the drawer 390. This is according to restrictions of the architecture configuration of the V4 printer driver illustrated in FIGS. 9A and 9B. Accordingly, it can be prevented that the store display 370 and the prohibition rule processor 380 change a registry and the like used by the OS to have an adverse effect on the operation of the OS.

The store display 370 and the prohibition rule processor 380 can access the property bag, and an access to an external file is limited. Thus, as the desktop display 360 stores the connection destination information in a format that can be processed using a script language in the queue property bag 340b, the prohibition rule processor 380 can execute prohibition rule processing.

Until now, the functional configuration and the storage areas of the information processing apparatus have been described. Hereinafter, the installation of the printer driver 350, a printing process using the printer driver 350, and the process of configuring a model common printer driver that is performed in the printing process will be described in detail.

First Embodiment

First, the installation of the printer driver 350 will be described with reference to FIG. 10. The installation of the printer driver 350, for example, may be performed using a function called a wizard. In the installation of the printer driver 350, a wizard called an add printer wizard may be used. On the other hand, the installation may be performed using an installer other than the wizard. Here, an example in which installation is performed using an installer will be described.

The process of installing the printer driver 350 is performed using an installer 400, an OS 410, a prohibition rule processor 380 of an installed printer driver 350.

In order to operate the printer driver 350 under the control of the OS 410, the installer 400 installs the printer driver 350 (S1 illustrated in FIG. 10). In this installation, for example, an installation destination is selected, files that are necessary for realizing the function of the printer driver 350 are copied to the selected installation destination, and various settings are performed. Accordingly, the printer driver 350 can operate on the OS 410, the functional units described above are generated, and the processes using the functional units can be performed.

The installer 400 generates a printer icon of a printer 120 that corresponds to the installed printer driver 350 (S2 illustrated in FIG. 10). According to the generation of the printer icon, a user can select the printer 120 and execute a print job using the selected printer 120.

The installer 400 reads customize information stored in the queue property bag 340b in advance (S3 illustrated in FIG. 10). The customize information is a value after change in a case where an initial value (default value) set for each function is changed or a value after an increase or decrease in a case where the number of options that can be set is increased or decreased, in other words information of a changed value or the like. For example, the customize information may be information of only monochrome printing for allowing a printer that can perform color printing and monochrome printing to use only the monochrome printing.

In a case where the customize information is registered, the installer 400 performs a setting change of the default value (S4 illustrated in FIG. 10). On the other hand, in a case where the customize information is not registered, the installer 400 ends the installation process.

The OS 410 receives the setting change and requests the prohibition rule processor 380 to check (setting check) whether the changed value is valid (S5 illustrated in FIG. 10). In this step, the model is not specified, and thus, the prohibition rule processor 380 checks whether or not the changed value is valid by referring to model common information stored in the driver property bag 340a. In a case where the changed value is not valid, a notification indicating invalidness may be returned. The OS 410 transmits a notification indicating invalidness to the installer 400, and the installer 400 receives the notification and can end the installation process without making a change to the changed value.

The OS 410 returns a notification indicating validness from the prohibition rule processor 380 to the installer 400. When the notification is received, the installer 400 changes the default value to the changed value. The installer 400 performs the change to the changed value by changing registry information (S6 illustrated in FIG. 10). The registry information is various kinds of setting information used by the OS 410 and includes the default value, the information of options, and the like.

In addition, the model common information, the model specific information, and the like may be stored in the driver property bag 340a in advance.

In the installation process illustrated in FIG. 10, while a model name and the like that are necessary for configuring a model common printer driver are not acquired, the process of acquiring a model name and the like may be included in the installation process. By acquiring a model name and the like at the time of installation, thereafter, when switching of the printer 120 is performed, a model common printer driver can be configured without acquisition of a model name and the like, and a function unique to the model can be used as well.

The installation process including the process of acquiring a model name and the like will be described with reference to FIGS. 11A and 11B. The process illustrated in FIGS. 11A and 11B, similar to the process illustrated in FIG. 10, uses the installer 400, the OS 410, and the prohibition rule processor 380 and is performed by using the device information acquirer 362, the storage controller 364, and the connection destination information generator 365 included in the desktop display 360 and a printer 120.

The process of S1 to S3 illustrated in FIG. 11A is similar to the process of S1 to S3 illustrated in FIG. 10, the process of S11 to S13 illustrated in FIG. 11B is similar to the process of S4 to S6 illustrated in FIG. 10, and thus, the same description will not be presented. Since there are cases where information set to the customize information cannot be applied depending on a model, it is necessary to correct the customize information based on the model information and then apply the corrected customize information. For example, even when the color is set as a default value in the customize information, in the case of a monochrome model, the color cannot be set as the default value, it is necessary to correct the default value to the monochrome and the like first.

Thus, the installer 400 requests the device information acquirer 362 to acquire a model name and a state of the model of a printer 120 that is currently connected (S4 illustrated in FIG. 11A). Here, the installer 400 may request for the acquisition of only a model name.

The device information acquirer 362 performs two-way communication with the printer 120 and acquires the model name from the printer 120 (S5 illustrated in FIG. 11A). In addition, the device information acquirer 362 acquires the state of the model (model state) from the printer 120 (S6 illustrated in FIG. 11A). In this example, while a model name is acquired first, and thereafter, a model state is acquired, the acquisition order may be reversed, or a model name and a model state may be simultaneously acquired.

After the acquisition of a model name and the like, the device information acquirer 362 requests the connection destination information generator 365 to generate connection destination information (S7 illustrated in FIG. 11B). The connection destination information generator 365 generates connection destination information based on the model name acquired by the device information acquirer 362 (S8 illustrated in FIG. 11B). The device information acquirer 362 requests the storage controller 364 to store the model name, the model information, and the connection destination information (S9 illustrated in FIG. 11B). The storage controller 364 stores the model name, the model state, and the connection destination information acquired by the device information acquirer 362 in the queue property bag 340b (S10 illustrated in FIG. 11B). The device information acquirer 362 notifies the installer 400 of the acquisition of the model name and the model state. The installer 400 performs a change of the default setting and a change of the registry information by referring to the model name and the like that are stored.

The installer 400 is software and is an application other than the store application 310. For this reason, the installer 400 can communicate with the outside without having a limit such as a limit of the store application 310. Accordingly, the installer 400 may acquire a model name and the like from the printer 120 by directly performing two-way communication with the printer 120 not through the desktop display 360 as illustrated in FIG. 11A.

Figure 5B:
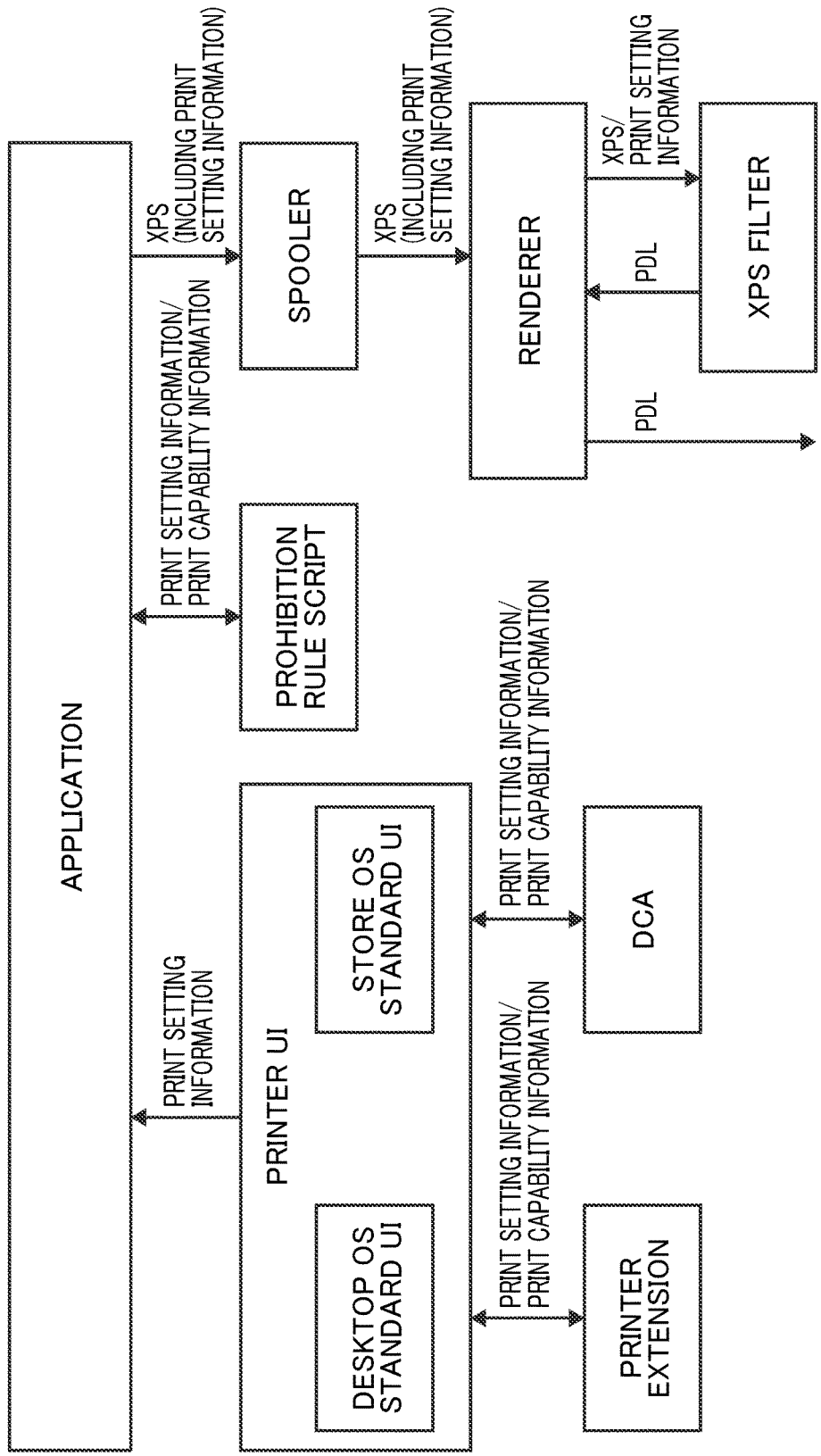

Next, a process performed when an installed printer driver outputs a print job will be described with reference to FIGS. 5A and 5B. FIGS. 5A and 5B are diagrams that illustrate an overview of a process of outputting a print job from the printer driver. FIG. 5A illustrates the case of a V3 printer driver, and FIG. 5B illustrates the case of a V4 printer driver.

In the V3 printer driver illustrated in FIG. 5A, a print setting set by a printer UI is stored in a DEVMODE structure body and is transmitted to an application. The DEVMODE structure body is configured by a vender-common public part and a vender-specific private part and stores information set in the print setting. Thereafter, a graphics device interface (GDI) including the DEVMODE structure body is transmitted from the application to a spooler.

Next, the spooler outputs a device driver interface (DDI) to a renderer. The renderer converts data into a data format for performing print such as a PDL based on a command of the DDI and performs printing by outputting a print command to a printer.

Meanwhile, in the V4 printer driver illustrated in FIG. 5B, a printer extension that is an extended UI of the desktop application 320 or a device companion application (DCA) that is an extended UI of the store application 310 and a printer UI exchange print setting information (print ticket) or print capability information (print capability), whereby a change of the setting item or the like is provided for a user. Each of the printer extension and the DCA enables provision of a vendor-specific print setting screen for a user, and, in a case where the support of the change of the setting item or the like is not specified in a manifest file of a driver package, an OS-standard print setting screen is provided by the printer UI. As OS-standard print setting screens, there are two print setting screens including a desktop screen and a store screen. In addition, on the OS-standard print setting screen, a vendor-specific print setting item such as authentication printing is not displayed.

In addition, in a prohibition rule script, prohibition rule processing relating to the print setting information or the print capability information is performed without accompanying the display of a screen, in other words, not in accordance with a user operation. Also in the V3 printer driver as illustrated in FIG. 5A, while there is a module performing prohibition rule processing, there is a restriction of mounting using JavaScript in the V4 printer driver.

In addition, an application receives the print setting information from a printer UI and transmits data in an XML paper specification (XPS) format to a spooler. The data in the XPS format includes print setting information. A renderer transmits/receives data to/from an XPS filter and outputs a print command to the printer, thereby performing printing.

Figure 12B:
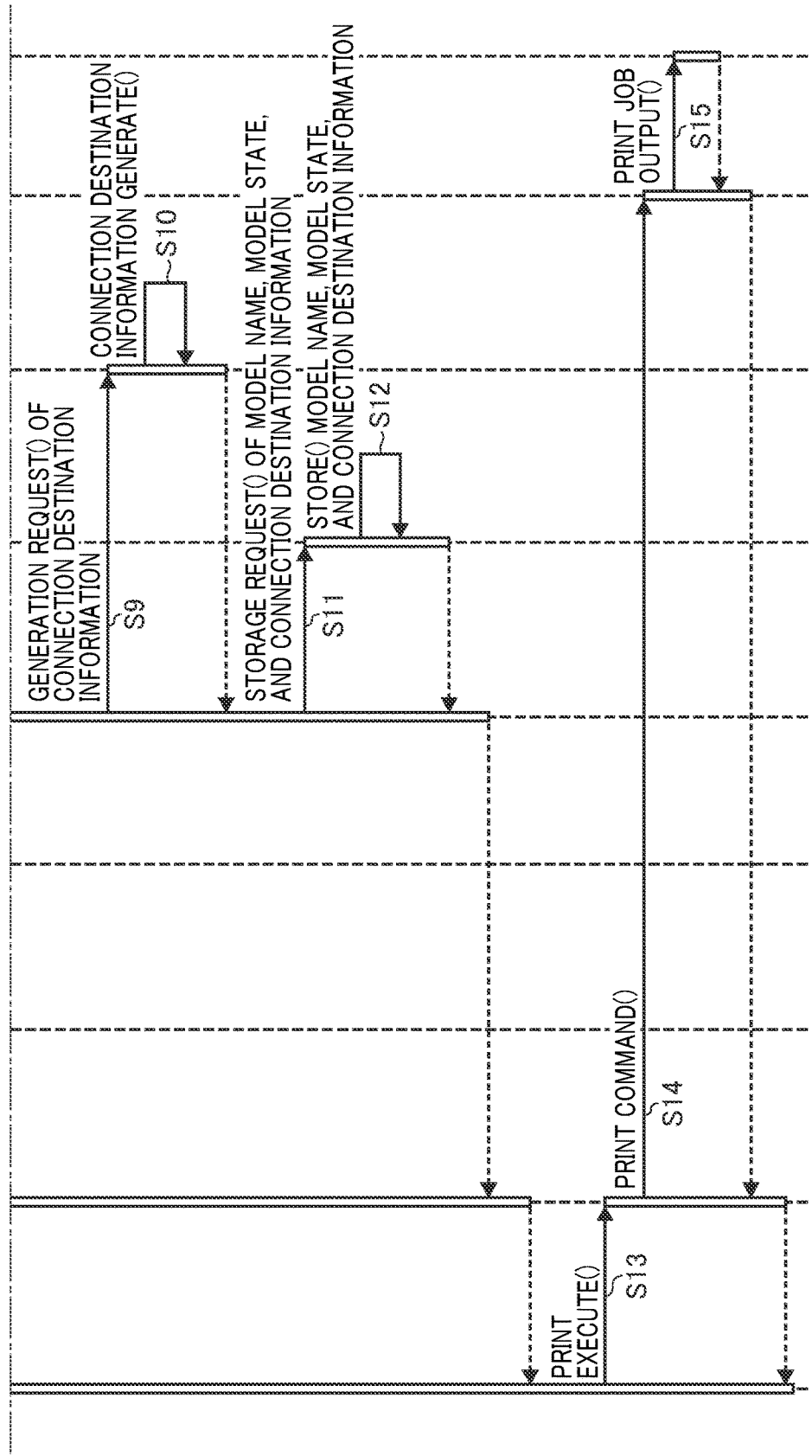

A process performed when the printer driver described above outputs a print job will be described in detail with reference to FIGS. 12A and 12B. The process illustrated in FIGS. 12A and 12B is performed using one application 420 out of the store application 310 and the desktop application 320, the OS 410, the prohibition rule processor 380, one of the desktop display 360 and the store display 370, and the drawer 390. In this example, the device information acquirer 362, the storage controller 364, and the connection destination information generator 365 included in the desktop display 360 are described to be used.

A user generates data for printing by using one application 420 out of the store application 310 and the desktop application 320 and requests the application 420 to print the data. The user may read data that has already been generated, display the data by using the application 420, and request the printing of the data. The data that has been generated may be data inside the information processing apparatus or data acquired by being downloaded from another apparatus connected to the network. The data may be data of a document, a table, or a diagram or image data.

The application 420 checks the print setting that is currently set without accompanying the display of the screen (S1 illustrated in FIG. 12A). For example, in the application 420, a printer 120 to be used, the size of a sheet to be used, and the like are set. The OS 410 requests the prohibition rule processor 380 to check (setting check) whether or not the set value of the print setting is valid (S2 illustrated in FIG. 12A). The prohibition rule processor 380 performs the checking of the set value and returns a result of the checking to the OS 410. The OS 410 returns the result to the application 420.

The application 420 can display information of a printer 120, a sheet size, and the like that are set, a button used for switching to a user setting screen, a print button used for the execution of printing, and the like based on the received result. In this display, the user can select another printer 120 or change the sheet size or the like.

The user determines the printer 120 and presses the above-described button used for switching to the user setting screen to perform a detailed print setting. The application 420 receives the pressing of this button and requests the OS 410 to display a print setting (S3 illustrated in FIG. 12A). The OS 410 requests the prohibition rule processor 380 to perform setting checking (S4 illustrated in FIG. 12A). The prohibition rule processor 380 performs setting checking and returns a result of the checking to the OS 410.

The OS 410 receives that a result of the checking is valid and the print setting is determined and instructs the desktop display 360 to operate a user setting screen that is based on the determined print setting (S5 illustrated in FIG. 12A). In contrast to this, in a case where the result of the checking is invalid, the OS 410 may perform changing of a setting item of the invalid print setting to a default setting, deleting of the invalid print setting, or the like and give an instruction for operating the user setting screen. On the operated user setting screen, the user can change a print setting. The desktop display 360 notifies the application 420 that the user's checking or changing of the print setting ends, and the user setting screen is closed through the OS 410.

When the notification descried above is received, the OS 410 requests the device information acquirer 362 included in the desktop display 360 to acquire a model name and model information similar to S4 illustrated in FIG. 11A (S6 illustrated in FIG. 12A). Inside the desktop display 360, processes similar to S5 to S10 illustrated in FIGS. 11A and 11B are performed in S7 to S12 illustrated in FIGS. 12A and 12B. In other words, a model name and a model state are requested to be acquired from the printer 120, connection destination information is generated, and the model name and the model state that have been acquired and the generated connection destination information are stored.

The application 420 receives user's pressing of a print button and instructs the OS 410 to execute printing (S13 illustrated in FIG. 12B). The OS 410 receives the instruction and directs the drawer 390 to execute printing (S14 illustrated in FIG. 12B). The drawer 390 generates drawing data in a format that can be interpreted by the printer 120 based on the print setting and outputs the generated drawing data to the printer 120 set as a print job (S15 illustrated in FIG. 12B).

In addition, the setting checking performed in S2 and S4 illustrated in FIG. 12A may be performed only for the print setting information or may be performed for both the print setting information and the print capability information. The print setting information and the print capability information, as described with reference to FIGS. 12A and 12B, are in the form of giving a notification to various applications. Since the setting checking described above or the operating of the user setting screen are executed by functional units included in the printer driver 350, hereinafter, the process executed by the printer driver 350 will be described in detail.

First, the flow of data according to the process executed by the V4 printer driver described with reference to FIG. 5B will be described more specifically. FIG. 6 is a diagram that illustrates the flow of data of the V4 printer driver that corresponds to the configuration of the printer driver 350 according to the first embodiment.

The desktop display 360 is a module corresponding to the printer extension illustrated in FIG. 9B and can perform two-way communication with the printer 120 owing to no restriction on the process to be executed in the V4 printer driver. Thus, first, by performing two-way communication, the desktop display 360 acquires a model name of the model that is currently connected and stores the acquired model name in the queue property bag 340b. The desktop display 360 may acquire a model name by allowing the user to input or designate the model name.

The desktop display 360 can acquire a model name at at least a plurality of timings at which the desktop display 360 is called. As an example of one of the timings is when a user opens a device setting screen used for performing various settings for a device such as the printer 120, and switches a model to be used on the device setting screen. Another example of the timing is when the print setting screen at the time of printing is called (FIGS. 12A and 12B). The process of switching of a model to be used on the device setting screen described above will be described with reference to FIG. 13.

In a standard device property sheet used in the option setting, a vender cannot be extended by the V4 printer driver. The reason for this is that a specification in which the specification of the architecture of the V4 printer driver cannot be extended is formed. Thus, a device setting screen is displayed by another unit, and a function extended according to the device setting screen, for example, the acquisition of a model name described above is realized.

The user, by using an explorer 440 that is an application for reading and searching information, opens a menu by right-side clicking on a displayed printer icon and calls a device extension from the menu, thereby calling the desktop display 360. This method is merely an example, and the method is not limited to the example. In this way, the explorer 440 instructs the desktop display 360 to call and display a device setting screen (S1 illustrated in FIG. 13).

The desktop display 360 receives the instruction and displays the device setting screen (S2 illustrated in FIG. 13). Then, the desktop display 360 acquires a model name by performing two-way communication with the printer 120 that is currently connected (S3 illustrated in FIG. 13). In addition, the desktop display 360 also acquires a model state (S4 illustrated in FIG. 13). Here, while the configuration in which the model of the printer 120 that is currently connected is automatically acquired has been illustrated as an example, the configuration is not limited to the example, but a user may manually set a used model. In addition, the order of acquisition of a model name and a model state may be reversed, or a model name and a model state may be simultaneously acquired.

Subsequently, the desktop display 360, similar to S7 and S8 illustrated in FIG. 11B, generates connection destination information by using the connection destination information generator 365 (S5 illustrated in FIG. 13).

The desktop display 360 can accept a user's setting change. The user can change the setting by ignoring the current setting and putting a check mark in a check box of a displayed setting item or the like. The desktop display 360 stores a model name and model state that have been acquired, a change value in the case of a setting change, connection destination information, and the like in the queue property bag 340b (S6 illustrated in FIG. 13). The desktop display 360 notifies the explorer 440 that such storage ends, and the device setting screen is closed.

In this embodiment, in all the three scenes including a scene of installation (FIG. 11A), a scene of printing execution (FIG. 12B), and a scene to be described from now in which a device setting screen is called (FIG. 13), while the acquisition of a model name and the generation of connection destination information are performed, such processes do not necessarily need to be performed in all the scenes but may be performed in any one or two of the scenes.

By referring back to FIG. 6, the desktop display 360 refers to the driver property bag 340a based on the model name stored in the queue property bag 340b and generates connection destination information corresponding to the script language. Here, by storing the connection destination information generated here in the queue property bag 340b, an access from the store display 370 or the prohibition rule processor 380 can be made. The connection destination information includes an icon used for displaying a capability of the model, language information, and the like in addition to functions and an option of the model. Here, the option is the state of the model that is currently connected and is acquired through two-way communication between the desktop display 360 and the printer 120. As the option information included in the connection destination information, in a case where an automatic document feeder (ADF) is added to extend the function of the model, information indicating being equipped with the ADF is an example of the option information.

The connection destination information generated in the queue property bag 340b by the desktop display 360 is processed by the store display 370 and the prohibition rule processor 380, and thus, a data format of a text format such as a Json format or an Ini format that can be easily processed by such functional units or a serialized binary format, or the like is preferable.

In this way, as the desktop display 360 dynamically generates connection destination information, the connection destination information that is also in consideration of the state of the printer 120 can be stored. Accordingly, the connection information does not need to be generated before installation and be included in a package of a printer driver, and thus, the volume of the package can be decreased.

In addition, the desktop display 360 may store a mapping table in the queue property bag 340b. The mapping table is a table that represents a correspondence relation between a string that is used for an internal process of the printer driver 350 of the prohibition rule processor 380 or the like as a string representing a function and a string used for the print setting information or the print capability information. The mapping table is drawn from mapping data of the driver property bag 340a in accordance with the model name. According to such a mapping table, print setting information or print capability information in which the function for each model is included and stored can be determined.

As an example of this determining process, there is a process of changing the assignment of an option of a function handled inside a driver to print setting information or print capability information for each model. According to this process, for example, options that are internally handled as a tray 1, a tray 2, and a large-capacity tray in a model A and are internally handled as a tray 1, a tray 2, and a tray 3 in a model B can be described as a tray 1, a tray 2, and a tray 3 in both models in the print capability information.

In addition, the mapping table, similar to the connection destination information, is preferably in a data format that can be easily processed by the store display 370 and the prohibition rule processor 380 such as a text format or a serialized binary format.

In addition, the prohibition rule processor 380 is a module corresponding to a prohibition rule script illustrated in FIG. 9B and performs the processing of the print setting information and the print capability information. The prohibition rule processor 380, for example, determines whether a combination of print settings is valid. A combination that is determined to be invalid may be set as non-display. In addition, the prohibition rule processor 380, in response to a request from the OS 410, the application 420, or the like, replies with print capability information representing information of functions that can be set in the printer driver 350 and replies with print setting information representing set values of various functions set in the printer driver 350. The print setting information may be stored in a devmode property bag not illustrated in FIGS. 4A and 4B.

For example, in a case where security information such as personal information used for a billing process or an authentication process is stored in print setting information output to the printer 120, the prohibition rule processor 380 performs encryption processing. In addition, in a case where a model name is stored in the queue property bag 340b, the prohibition rule processor 380, in accordance with the model name, can acquire a mapping table according to the model from the driver property bag 340a and can perform the process using the mapping table.

On the other hand, a script is arranged in the OS 410 as it is, and accordingly, the prohibition rule processor 380 is in a state in which the process can be seen from the outside. For this reason, also in the case of encryption, the encryption method can be deciphered from the outside, and the level of the security of the encryption is lowered. In addition, among functions, there are functions that use personal information (a user name, a password, or the like) that should not be leaked to the outside. Thus, it is preferable to provide security according to a method described below.

First, in a step in which the model is specified, the desktop display 360 generates information for encryption (encryption information) together with a mapping table and stores the encryption information in the queue property bag 340b together with the mapping table. At this time, the encryption information is converted into a format such as a binarized format that is difficult to decipher from the outside by the desktop display 360. The encryption information includes an encryption system (encryption algorithm) such as a wired equivalent privacy (WEP), a temporal integrity protocol (TKIP) or an advanced encryption standard (AES) and information used for the encryption. The encryption information is described in the connection destination information to be stored.

The prohibition rule processor 380 encrypts personal information by using the encryption information included in the connection destination information, inserts the encrypted personal information into a corresponding portion, thereby generating print setting information including the encrypted personal information. In this way, by maintaining the encryption information in a module such as the desktop display 360 that is difficult to decipher from the outside, the security can be improved.

Since the encryption system and the information used for encryption have a compatible system that is different according to the model, in a step in which the printer 120 of the connection destination is determined, the desktop display 360 can store an encryption logic matching the determined printer 120 in the mapping table. In addition, the encryption system and the information used for encryption may be stored in not the desktop display 360 but the driver property bag 340a for each model, and the encryption system to be used and the information used for encryption may be acquired and applied according to the selected model.

In addition, while an example of a case where the desktop display 360 maintains the encryption information has been illustrated in the description presented above, encryption information formed in a format that is difficult to decipher from the outside may be stored in each model specific information, and the desktop display 360 may acquire the encryption information for each model from the model information and write the acquired encryption information in the connection destination information. Thus, in order to improve the security, it is preferable to respectively store an encryption system and arguments included in the encryption information in the queue property bag 340*b* and the driver property bag 340*a* in a divisional manner.

In addition, the prohibition rule processor 380 may be configured to acquire the content of the prohibition rule processing from the driver property bag 340*a* in accordance with the model of the connection destination without describing the processes of all the models. By employing such a configuration, also in a case where an update for adding a compatible model to the model common driver is performed, the update can be performed by only adding model information without changing the module.

Figure 7:
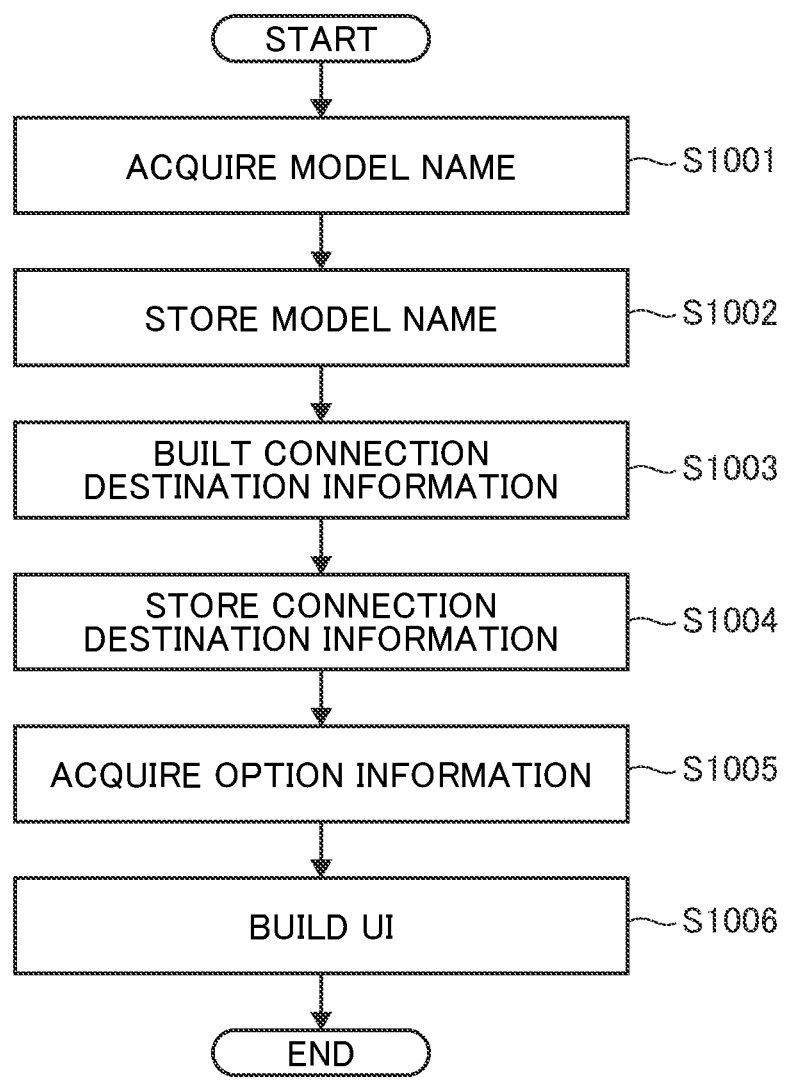
FIG. 7 is a flowchart of a process performed by a desktop display according to the first embodiment.
Figure 8A:
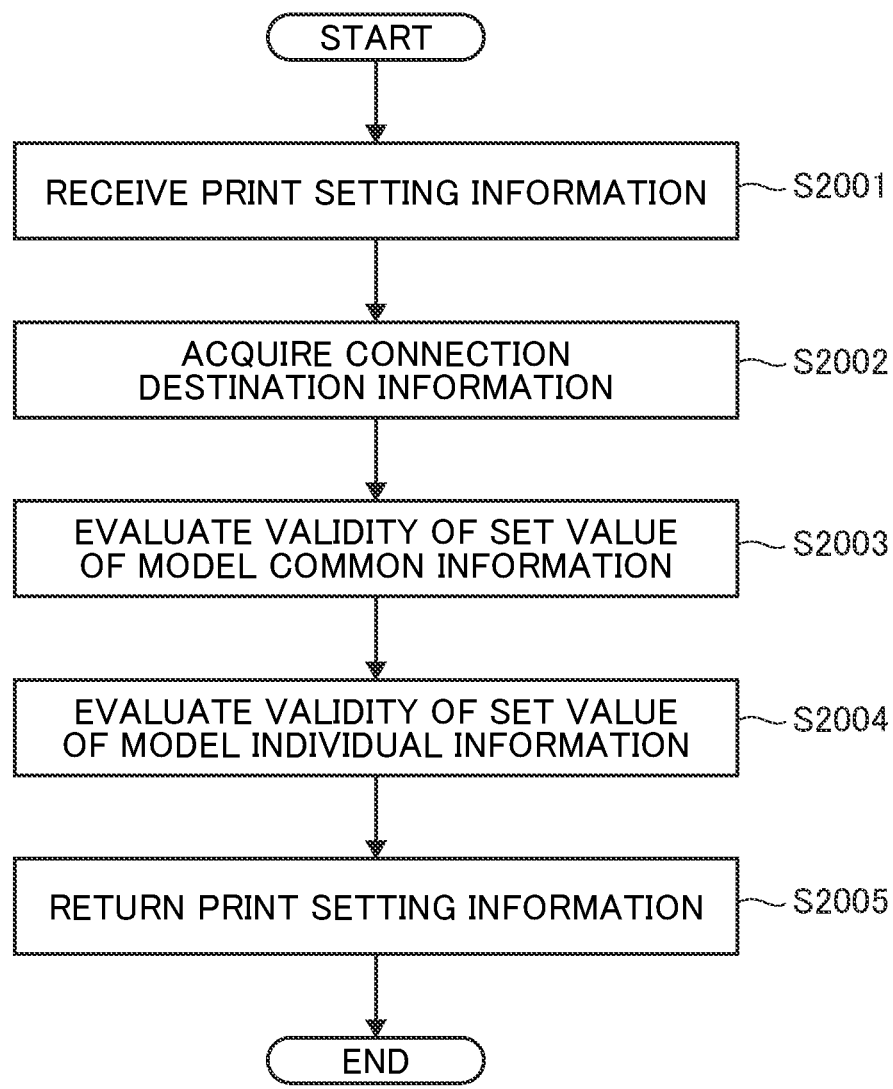
Figure 8B:
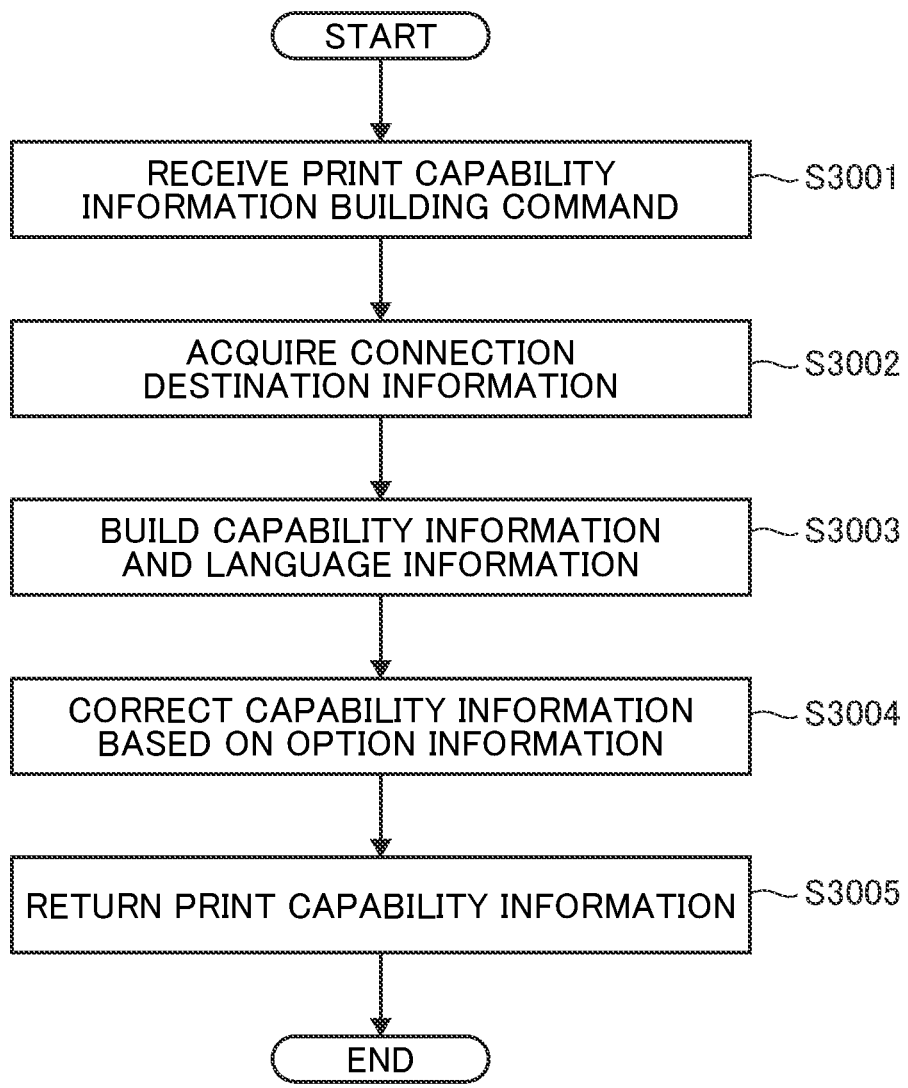

As above, the flow of data according to the process executed by the V4 printer driver has been described. Next, the processes performed in FIGS. 11A to 13 described above will be described with reference to more specific flowcharts. FIG. 7 is a flowchart of a process executed by the desktop display 360 according to the first embodiment, and the process is performed at a scene specifying the model information. FIGS. 8A to 8C are flowcharts that illustrate processes executed by modules based on model information and are scenes at which the processes are performed based on the model information stored in the process illustrated in FIG. 7.

First, the process of the desktop display 360 will be described with reference to FIG. 7. The process illustrated in FIG. 7 is started at a time when the desktop display 360 is called from the installer 400, the explorer 440, or the like, at a time when the print setting screen performing a print setting is called so as to print a file, or the like.

Thereafter, in Step S1001, the model name of the printer 120 is acquired. The model name may be acquired by the desktop display 360 through two-way communication with the printer 120, or the model may be acquired by directly designating through a user operation. This process is a process corresponding to S5 illustrated in FIG. 11A, S7 illustrated in FIG. 12A, and S3 illustrated in FIG. 13.

Next, in Step S1002, the acquired model name is stored in the queue property bag 340*b*. This process is a process that corresponds to S5 illustrated in FIG. 13. In Step S1003, based on the model name stored in Step S1002, connection destination information of a format in which a script process can be performed is built. As the connection destination information, by referring to the model name acquired from the model information of a plurality of models maintained by the driver property bag 340*a*, the model information corresponding to the model of the current connection destination is specified, and the connection destination information of the current connection destination is built. This process is a process that corresponds to S8 illustrated in FIG. 11B and S10 illustrated in FIG. 12B.

The connection destination information built in Step S1003 is stored in the queue property bag 340*b* in Step S1004. This process is a process that corresponds to S10 illustrated in FIG. 11B and S12 illustrated in FIG. 12B. In this example, while the model name and the connection destination information are separately stored, as illustrated in FIGS. 11A to 12, the model name and the connection destination information may be stored together in a step in which the connection destination information is generated.

In addition, the process of Step S1004 is not essential but may be replaced by the process described below. In a case where the desktop display 360 does not perform a storing process, the prohibition rule processor 380 and the store display 370 specify the model information corresponding to the model name among the model information maintained in the driver property bag 340*a* in accordance with the model name acquired from the queue property bag 340*b*, whereby the connection destination information can be generated.

Thereafter, in Step S1005, the print setter 363 of the desktop display 360 acquires option information from the queue property bag 340*b*. Then, in Step S1006, based on the model information, the option information, and the like, the UI of the acquired printer 120 is built and displayed, whereby the UI is provided for the user. Thereafter, the process ends. The process of Steps S1005 to S1006 may be executed after S2 illustrated in FIG. 12A or S12 illustrated in FIG. 12B, before S13 illustrated in FIG. 12B or after S14 illustrated in FIG. 12B and before S15 illustrated in FIG. 12B.

Next, FIGS. 8A to 8C will be described. FIG. 8A is a flowchart in which the prohibition rule processor 380 outputs the print setting information. Also this process, similar to the description presented above, is a process that is executed after S12 illustrated in FIG. 12B, before S13 illustrated in FIG. 12B.

As illustrated in FIG. 8A, the prohibition rule processor 380 receives print setting information from the desktop application 320 in Step S2001. Next, in Step S2002, the connection destination information stored in the queue property bag 340*b* is acquired.

In Step S2003, based on the acquired connection destination information, the validity of the model common information is evaluated. The evaluation of the validity of the model common information is performed by checking whether or not the set value of the print setting information, which is common to printers, not depending on a model is a valid value. As the model common information, for example, there is an aggregation setting or the like.

Thereafter, in Step S2004, based on the acquired connection destination information, the validity of the set value of the model specific information is evaluated. The evaluation of the validity of Step S2003 is performed by checking that the option information, the finishing function, and the like do not exceed the capabilities of the selected printer 120 for each print scheme (setting item).

After the evaluation of the validity in Steps S2003 and S2004, in Step S2005, the print setting information is returned to the desktop application 320, and the process ends. In addition, it is preferable that the encryption information is deleted after the print setting information that is encrypted is generated.

FIG. 8B is a flowchart in which the prohibition rule processor 380 outputs the print capability information. This process may be performed as is necessary. This process, similar to the process described above, may be executed after S2 illustrated in FIG. 12A or after S12 illustrated in FIG. 12B, before S13 illustrated in FIG. 12B or after S14 illustrated in FIG. 12B, before S15 illustrated in FIG. 12B. In the case of the process building the print capability information, the prohibition rule processor 380, in Step S3001 illustrated in FIG. 8B, receives a print capability information building command from the desktop application 320. Next, in Step S3002, the connection destination information stored in the queue property bag 340*b* is acquired. The process of Step S3002 is similar to the process of Step S2002.

Next, in Step S3003, capability information and language information are built. In building the capability information in Step S3003, the option of the set value is built for each print scheme. In addition, as the language information, language information of each set value is built based on the locale (the setting of a country or a region) of the OS or the desktop application 320. As the language information of the set value, for example, there is information of "stapling, upper right side" or the like.

In Step S3004, based on the option information of the current printer 120 that is stored in the queue property bag 340b, the capability information built in Step S3003 is corrected. The correction of the capability information is addition or deletion of the option of the set value or the like.

Thereafter, in Step S3005, the print capability information is returned to the desktop application 320, and the process ends.

According to the process illustrated in FIGS. 8A and 8B, the prohibition rule processor 380 can built the model common information and the model specific information corresponding to the printer 120. In addition, the process illustrated in FIGS. 8A and 8B may be performed individually in parallel with each other and continuously (sequentially) as is necessary.

Next, a process in which the store display 370 builds a store UI will be described with reference to FIG. 8C. The store display 370, in Step S4001, acquires the print setting information from the prohibition rule processor 380. Next, in Step S4002, the store display 370 acquires a model name of the model that is currently connected by referring to the queue property bag 340b. This process is a process that corresponds to S8 illustrated in FIG. 12A. A difference from the process illustrated in FIG. 12A is that this process is performed in a case where a print request is made from the store application 310.

Thereafter, in Step S4003, the store display 370 reads the connection destination information from the queue property bag 340b. Next, in Step S4004, print capability information corresponding to the model that is currently connected is built, and the validity of the print setting information is evaluated.

Next, in Step S4005, for the capabilities of the model that is currently connected, a UI on which the print setting information is reflected is built and displayed, whereby the UI is provided for the user, and the process ends. The process of Steps S4003 to S4005, similar to the description presented above, is a process that is executed after S12 illustrated in FIG. 12B and before S13 illustrated in FIG. 12B.

As described until now, according to the process illustrated in FIG. 8C, the store display 370 can generate a UI according to the model of the connection destination. Accordingly, by performing various processes illustrated in FIG. 6, various model common printer drivers in the V4 printer driver can be configured.

Figure 14A:
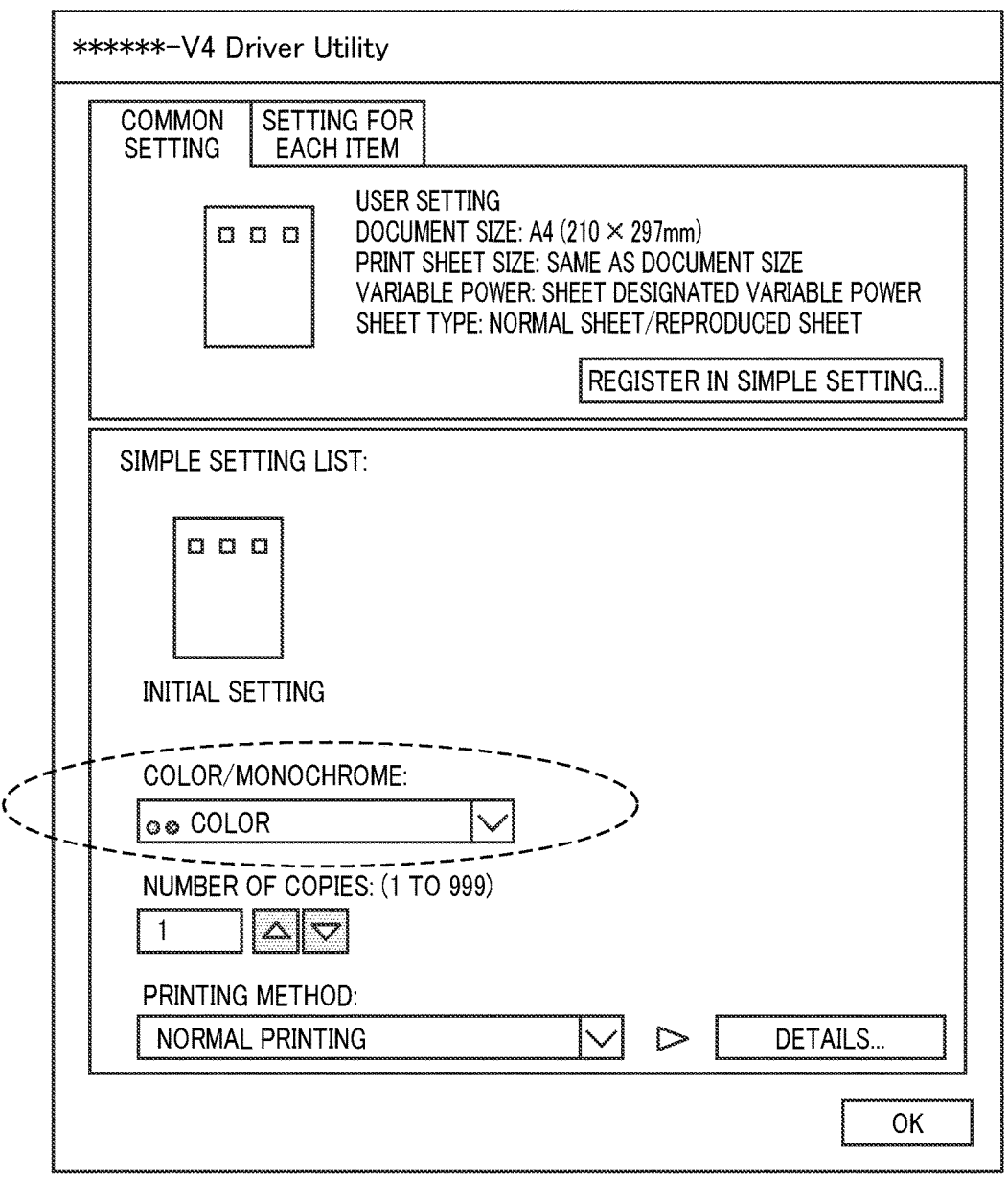
FIGS. 14A and 14B are diagrams that illustrate print setting screens displayed before and after a model is changed.
Figure 14B:
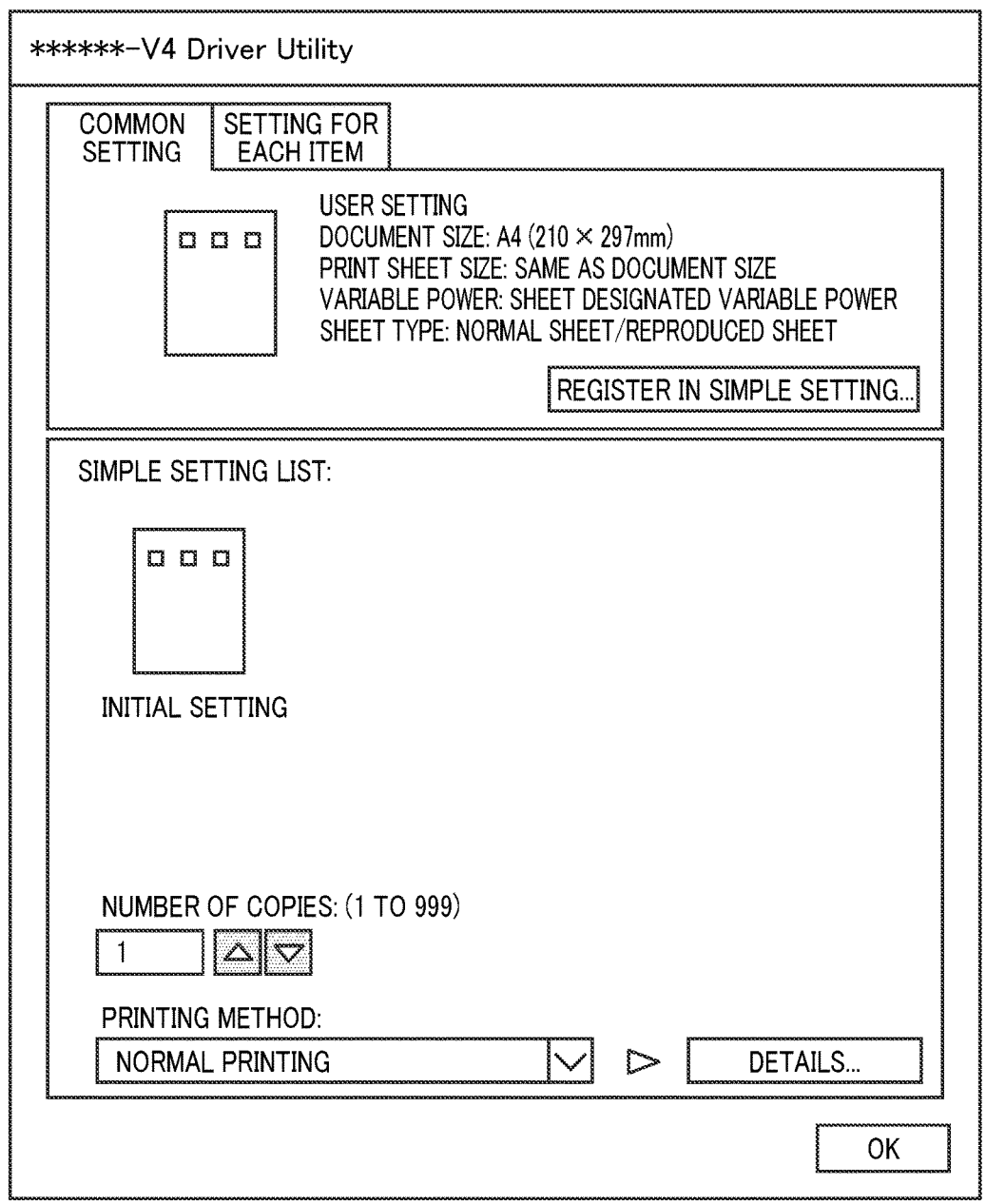

Examples of the UI displayed according to the process illustrated in FIG. 8C are illustrated in FIGS. 14A and 14B. FIG. 14A is a diagram that illustrates an example of the UI displayed by the store display 370 in the case of being connected to a color device capable of performing color printing. FIG. 14B is a diagram that illustrates an example of the UI displayed by the store display 370 in a case where the model is switched to a monochrome device by the process illustrated in FIG. 13.

As illustrated in FIG. 14A, in the case of being connected to a color device, a print setting item of color/monochrome denoted using a broken line is displayed, and any one of setting items can be selected. On the other hand, when switching to a monochrome device, as illustrated in FIG. 14B, the printing setting item of color/monochrome is not displayed.

Figure 15:
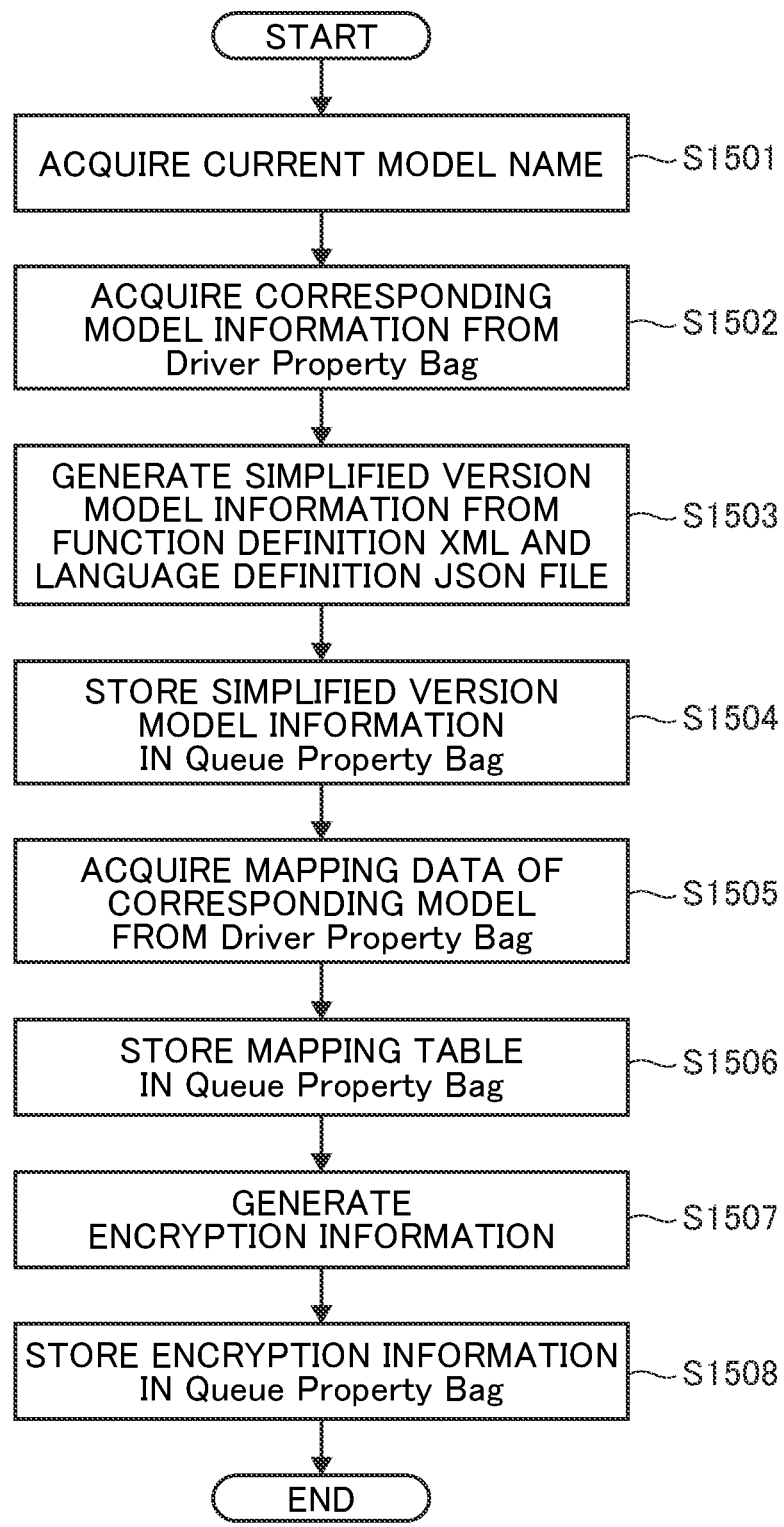
FIG. 15 is a flowchart that illustrates the flow of a process of generating connection destination information in accordance with a model.

Next, a detailed process of building connection destination information of Step S1003 illustrated in FIG. 7 will be described with reference to FIG. 15. FIG. 15 is a diagram that illustrates an example of a case where mapping information and encryption information are stored together with generation and storage of the connection destination information of S1003 and S1004 illustrated in FIG. 7. As the connection destination information, the simplified version model information described above is preferable, and here, a process of generating the simplified version model information will be described in accordance with a model. This process is a process in which the desktop display 360 generates simplified version model information used when the store display 370 and the prohibition rule processor 380 perform the process. The process illustrated in FIG. 15 can be performed in S5 to S10 illustrated in FIGS. 11A and 11B, S7 to S12 illustrated in FIGS. 12A and 12B, and S3 to S5 illustrated in FIG. 13.

In Step S1501, the desktop display 360 acquires a model name of the printer 120 that is currently connected from the queue property bag 340b. In Step S1502, the desktop display 360 acquires corresponding model information from the driver property bag 340a based on the acquired model name. Since the model information is defined in the format such as the XML, the JSON, or the like, in Step S1503, from an XML file defining a function and a JSON file defining a language, only information that is necessary for displaying a print setting screen is acquired in accordance with the option information, and simplified version model information is generated from the acquired necessary information. At this time, the simplified version model information is changed to a simple format that can be processed by the prohibition rule processor 380. Then, in Step S1504, the desktop display 360 stores the generated simplified version model information in the queue property bag 340b.

In Step S1505, the desktop display 360 acquires corresponding mapping data from the driver property bag 340a based on the model name acquired in Step S1501. The desktop display 360 reflects the acquired mapping data on the mapping table and stores the mapping table in the queue property bag 340b in Step S1506. In addition, the desktop display 360 generates encryption information in Step S1507 and stores the generated encryption information in the queue property bag 340b in Step S1508. According to this storage, the process ends. Here, while a process is formed in which, first, mapping data is acquired and stored, and thereafter, encryption information is generated and stored, the process is not limited to the form, but the process of generating and storing encryption information may be executed first, and both processes may be executed simultaneously.

Figure 16:
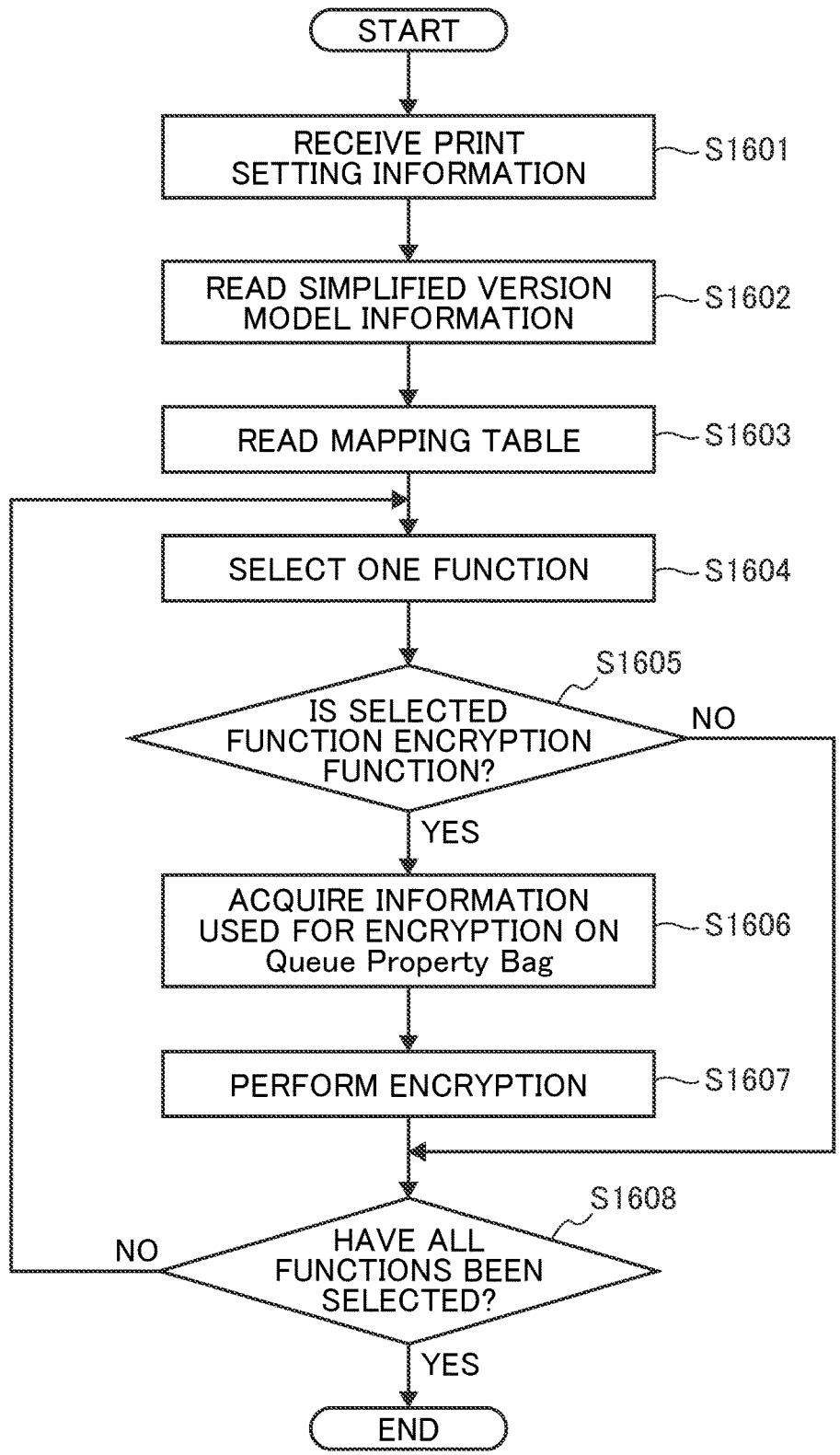
FIG. 16 is a flowchart that illustrates the flow of an encryption process according to a model.

The process of performing encryption of the print setting information will be described with reference to FIG. 16. After the print setting (function) to be encrypted is input to the printer driver 350, at timing at which the prohibition rule processor 380 is called in S2 illustrated in FIG. 13 and, after the drawer 390 is called in S14 illustrated in FIG. 13, the prohibition rule processor 380 is called from the drawer 390 through the OS 410, and accordingly, this encryption process can be performed at the called timing or the like. In addition, this encryption process can be performed by the prohibition rule processor 380.

In Step S1601, the prohibition rule processor 380 receives print setting information. In Step S1602, the prohibition rule processor 380 reads simplified version model information stored in the queue property bag 340b. In addition, in Step S1603, the prohibition rule processor 380 reads a mapping table stored in the queue property bag 340b. Here, the prohibition rule processor 380 may read the mapping table first and thereafter, read the simplified version model information.

In Step S1604, the prohibition rule processor 380 selects one function included in the simplified version model information. Then, in Step S1605, the prohibition rule processor 380 determines whether or not the selected function is an encryption function. Whether or not the selected function is an encryption function can be determined from the mapping table. The reason for this is that the mapping table corresponds to a function and represents whether or not the function is an encryption function and includes an encryption system to be used and print setting information in which the function is to be inserted in the case of the encryption. The mapping data may include information of the strength of the encryption. In the case of the encryption function, the process proceeds to Step S1606 and, in the case of no encryption function, the process proceeds to Step S1608.

The desktop display 360 is aware of a storage place on the driver property bag 340a of information used for encryption for each model and for each strength or a method of generating information used for the encryption described above. The storage place or the generation method is maintained as a code, and this code cannot be deciphered from the outside. The desktop display 360, after acquiring the model name, acquires information used for the encryption from the storage place or generates information used for the encryption using the generation method, and stores the information in a specific place of the queue property bag 340b.

In Step S1606, the prohibition rule processor 380 acquires the information, which is stored in the specific place of the queue property bag 340b, used for the encryption corresponding to the function and the strength. Here, while the information of the strength is also considered, the information may be information that is used for the encryption corresponding merely to the function. In Step S1607, the prohibition rule processor 380 encrypts personal information and the like for which the function is used by using the acquired information used for the encryption and inserts and stores encrypted information in the print setting information or the like.

At this time, the prohibition rule processor 380 acquires information used for the encryption from the specific place of the queue property bag 340b regardless of the model. For this reason, as the process of the prohibition rule processor 380 that can be deciphered from the outside, information for the encryption or the process for the encryption do not directly need to be described, and accordingly, the security can be improved. In addition, the prohibition rule processor 380, after storing the information in Step S1607, deletes the information, which is stored in the specific place of the queue property bag 340b, used for the encryption. Accordingly, a period in which the information used for the encryption is stored on the queue property bag 340b is shortened, and the security can be further improved.

In Step S1608, the prohibition rule processor 380 determines whether all the functions have been selected. In a case where all the functions have not been selected, the process is returned to Step S1604, and a next function is selected. On the other hand, in a case where all the functions have been selected, the encryption process ends.

Figure 17:
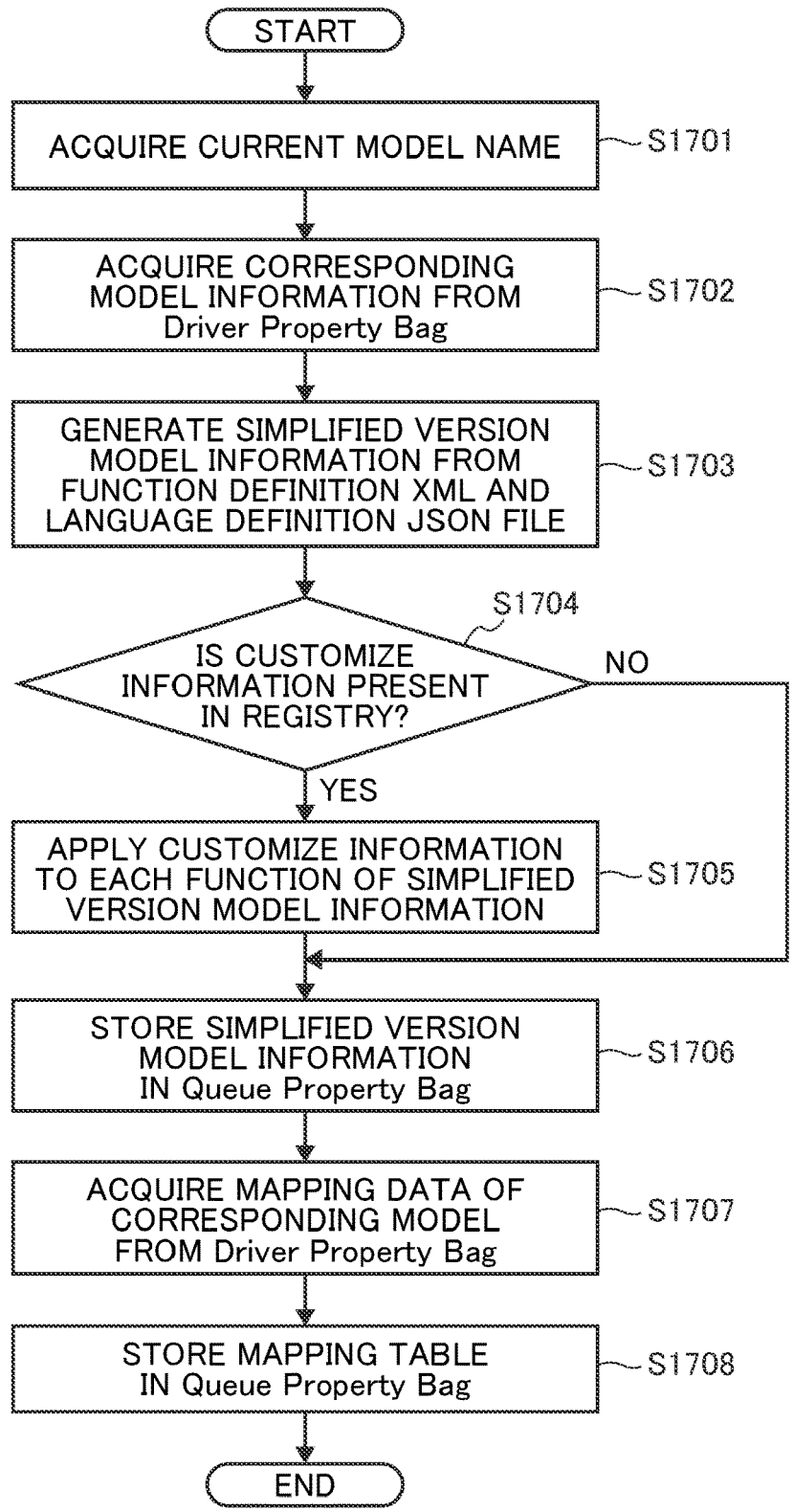
FIG. 17 is a flowchart that illustrates the flow of a process of customizing connection destination information.

Meanwhile, in the process of installing the printer driver illustrated in FIG. 10, the customize information is read, and the registry information is changed. The simplified version model information can be customized by applying the customize information determined at the time of the installation. The process of customizing the simplified version model information will be described with reference to FIG. 17.

First, the customize information is information written into the registry and is used in a case where the initial value is changed, a case where the set value is limited, or the like. As an example of limiting the set value, there is a case, in an aggregation setting, a setting enabling printing of one page, two pages, or four pages for one sheet is limited only to two pages.

Similar to the process illustrated in FIG. 15, in Step S1701, the desktop display 360 acquires a model name of the printer 120 that is currently connected. In Step S1702, the desktop display 360 acquires corresponding model information from the driver property bag 340a based on the acquired model name. Then, in Step S1703, the desktop display 360 acquired only necessary information in accordance with option information from an XML file defining the function and a JSON file defining a language and generates a simplified version model information from the acquired necessary information.

In Step S1704, the desktop display 360 determines whether or not the customize information is present in the registry. In a case where the customize information is present, the process proceeds to Step S1705, and, in a case where the customize information is not present, the process proceeds to Step S1706. In Step S1705, the desktop display 360 applies the customize information for each function of the simplified version model information. More specifically, the initial value is changed, or the number of options is increased or decreased.

In Step S1706, the desktop display 360 stores the simplified version model information to which the customize information is applied or the simplified version model information to which nothing is applied and having no change in the queue property bag 340b.

Thereafter, similar to the process illustrated in FIG. 15, in Step S1707, the desktop display 360 acquires corresponding mapping data from the driver property bag 340a based on the model name acquired in Step S1701. The desktop display 360 reflects the acquired mapping data on the mapping table and stores the mapping table in the queue property bag 340b in Step S1708. According to this storage, the process ends.

Second Embodiment

In the first embodiment, while an example of a case where the desktop display 360 stores the connection destination information generated according to the model identification information in the queue property bag 340b has been described, the process of generating connection destination information to be stored in the queue property bag 340b is a preferred example but is not essential. In a second embodiment, an example of the process of a case where a desktop display 360 does not generate connection destination information to be stored in a queue property bag 340b will be described.

<Flow of Data of V4 Printer Driver>

FIG. 18 is a diagram that illustrates the flow of data of a V4 printer driver according to the second embodiment.

The desktop display 360, as described in the first embodiment, can perform two-way communication with a printer 120. Thus, first, the desktop display 360 acquires model identification information (a model name or the like) of the printer 120 that is currently connected by performing two-way communication with the printer 120 and stores the acquired model identification information in the queue property bag 340*b* as connection destination information.

Preferably, at this time, the desktop display 360 acquires a model state (option information; a tray in which a sheet of a certain size is inserted or the like) of the printer 120 that is currently connected and stores the acquired model state in the queue property bag 340*b*.

There are a plurality of timings at which the desktop display 360 acquires model identification information (and the model state). For example, 1) when a printer driver 350 is installed at an information processing apparatus, 2) when a model is changed according to a user operation, or when the acquisition of the model identification information is necessary, 3) when a desktop application 320 displays a UI, and the like.

In this embodiment, the desktop display 360 does not generate connection information. In this embodiment, a store display 370 and a prohibition rule processor 380 acquire model identification information stored in the queue property bag 340*b* and acquire model information of a model specified by the model identification information from a driver property bag 340*a*. Accordingly, the store display 370 and the prohibition rule processor 380 can acquire model information of the printer 120 that is currently connected from the driver property bag 340*a* and execute a predetermined process.

Preferably, the store display 370 and the prohibition rule processor 380 acquire model identification information stored in the queue property bag 340*b* and acquire mapping data of a model specified by the model identification information. In this way, the store display 370 and the prohibition rule processor 380 generate the mapping table of the printer 120 that is currently connected by using the acquired mapping data and can execute a predetermined process according to the generated mapping table.

The predetermined process executed by the store display 370 and the prohibition rule processor 380 is similar to the process of the first embodiment.

<Flow of Process>

Subsequently, the flow of the process according to the second embodiment will be described.

(Installation Process)

FIGS. 19A and 19B are sequence diagrams that illustrate an example of an installation process according to the second embodiment. In the process illustrated in FIGS. 19A and 19B, the process of Steps S1 to S6 is similar to the installation process (second example) according to the first embodiment illustrated in FIG. 11A, and here, difference from the first embodiment will be focused in the description.

In this embodiment, a device information acquirer 362, after acquiring a model name and a model state from the printer 120 in Steps S5 and S6 illustrated in FIG. 19A, executes the process of Step S7 illustrated in FIG. 19B without generating the connection destination information.

In Step S7 illustrated in FIG. 19B, the device information acquirer 362 requests a storage controller 364 to store the model name and the model state that have been acquired.

In Step S8 illustrated in FIG. 19B, the storage controller 364 stores the model name (model identification information) and the model state acquired by the device information acquirer 362 in the queue property bag 340*b*. In addition, the device information acquirer 362 notifies an installer 400 of the acquisition of the model name and the model state.

In a case where customize information is registered in Step S3 illustrated in FIG. 19A, the installer 400 executes a default value changing process illustrated in Step S9 and subsequent steps in FIG. 19B.

In Step S9 illustrated in FIG. 19B, the installer 400 requests the OS 410 to perform a setting change of the default value.

In Step S10 illustrated in FIG. 19B, the OS 410 receives a request for the setting change of the default value and requests the prohibition rule processor 380 to check (setting check) whether a change value of the customize information is a valid value. The prohibition rule processor 380 acquires the model information specified by the model name acquired by the device information acquirer 362 from the driver property bag 340*a* and checks whether or not the change value is valid by using the acquired model information. In a case where the change value is not valid, the prohibition rule processor 380 can return a notification indicating that the change value is not valid to the OS 410. In this case, the OS 410 transmits a notification indicating that the change value is not valid to the installer 400, and the installer 400 receives the notification and ends the installation process without changing the default value setting.

As another example, in Step S10 illustrated in FIG. 19B, the OS 410 may request the prohibition rule processor 380 to perform prohibition rule processing (for example, change, deletion, or the like of a setting item, a set value, and the like that are not valid) solving a contradiction of the change values of the customize information. In such a case, the prohibition rule processor 380 solves a contradiction of the change values of the customize information, generates valid change values, and notifies the OS 410 of an indication of valid change values.

When the notification of the indication of valid change values of the customize information is received from the prohibition rule processor 380, the OS 410 returns the notification to the installer 400.

In Step S11 illustrated in FIG. 19B, when the notification of the indication of valid change values of the customize information is received, the installer 400 reflects the change values of the customize information on the default values. For example, by changing the registry information, the installer 400 reflects the change values of the customize information on default values.

(Printing Process)

FIGS. 20A and 20B are sequence diagrams that illustrate an example of a printing process according to the second embodiment. In the processes illustrated in FIGS. 20A and 20B, the process of Steps S1 to S5 is similar to the printing process according to the first embodiment illustrated in FIG. 12A, and here, differences from the first embodiment will be focused in the description.

In Step S6 illustrated in FIG. 20A, the desktop display 360 requests the device information acquirer 362 to acquire a model name and a model state.

In Step S7 illustrated in FIG. 20A, the device information acquirer 362 acquires a model name from the printer 120 by performing two-way communication with the printer 120. In addition, in Step S8 illustrated in FIG. 20A, the device information acquirer 362 acquires a model state from the printer 120.

In this embodiment, after acquiring a model name and a model state from the printer 120 in Steps S7 and S8 illustrated in FIG. 20A, the device information acquirer 362 executes the process of Step S9 illustrated in FIG. 20B without generating the connection destination information.

In Step S9 illustrated in FIG. 20B, the device information acquirer 362 requests the storage controller 364 to store the model name and the model state that have been acquired.

In Step S10 illustrated in FIG. 20B, the storage controller 364 stores the model name (model identification information) and the model state acquired by the device information acquirer 362 in the queue property bag 340b.

In Step S11 illustrated in FIG. 20B, the desktop display 360 acquires model information specified by the model name acquired by the device information acquirer 362 from the driver property bag 340a and displays a print setting screen by using the acquired model information. On the displayed print setting screen, the user can change the print settings. The desktop display 360 notifies the application 420 of the end of the checking and changing of the print settings by the user and the closing of a user setting screen through the OS 410.

In Step S12 illustrated in FIG. 20B, the application 420, for example, receives user's pressing of a print button and instructs the OS 410 to execute printing.

In Step S13 illustrated in FIG. 20B, the OS 410 receives an instruction from the application 420 and directs the drawer 390 to execute printing. In Step S14 illustrated in FIG. 20B, the drawer 390, based on the print setting, generates drawing data (print data that can be printed) of a format that can be interpreted by the printer 120 and outputs the generated drawing data to the set printer 120 as a print job.

(Process of Changing Model)

FIG. 21 is a sequence diagram that illustrates an example of the process of changing a model according to the second embodiment. In the process illustrated in FIG. 21, the process of Steps S1 to S4 is similar to the process of changing a model according to the first embodiment illustrated in FIG. 13, and here, points different from the first embodiment will be focused in the description.

In this embodiment, the desktop display 360, after acquiring a model name and a model state in Steps S3 and S4 illustrated in FIG. 21, accepts a user's setting change without generating the connection destination information.

In Step S5 illustrated in FIG. 21, the desktop display 360 stores the model name and the model state that have been acquired, a change value in the case of a setting change, and the like in the queue property bag 340b. The desktop display 360 notifies the explorer 440 of the end of the storage and the closing of the device setting screen.

In this way, in this embodiment, the desktop display 360 does not generate the connection information.

Subsequently, an example of the process executed by each module according to this embodiment will be described with reference to FIGS. 22A, 22B, and 22C.

(Process of Outputting Print Setting Information)

Figure 22A:
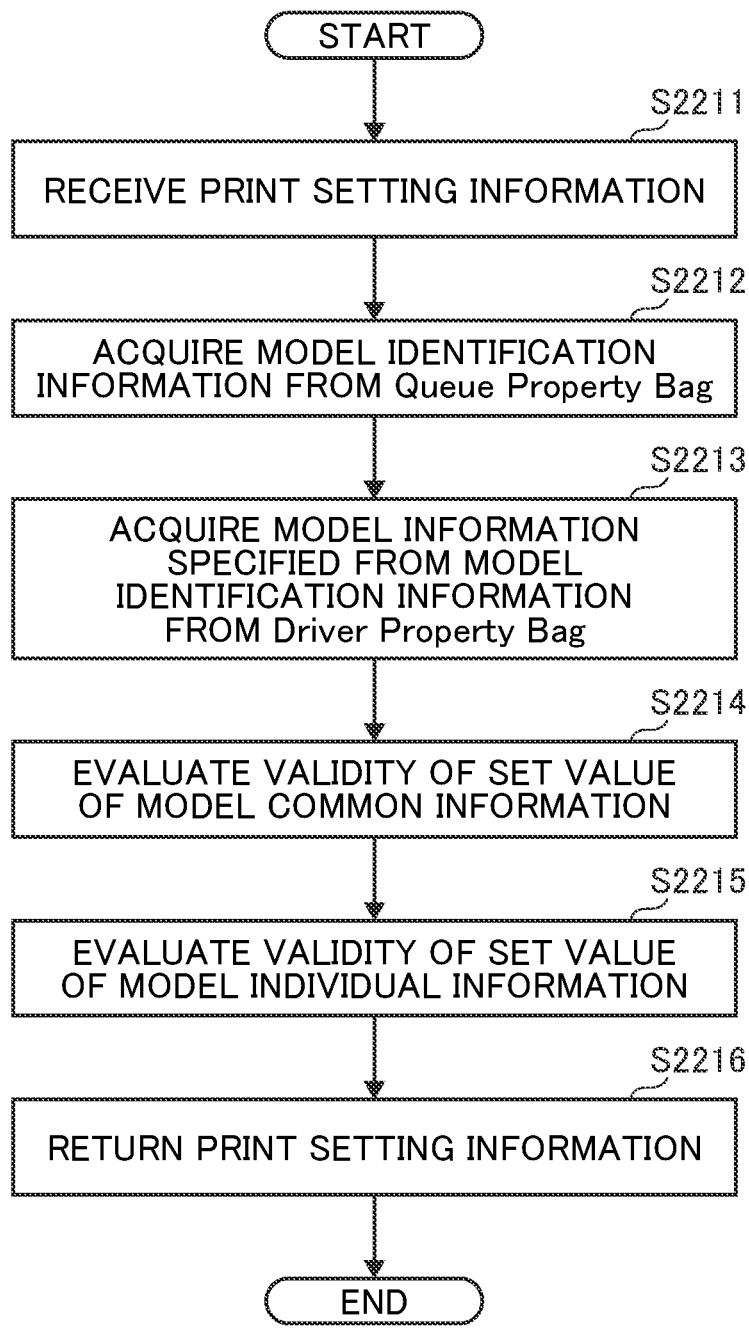

FIG. 22A is a flowchart that illustrates an example of the process of outputting print setting information according to the second embodiment. This process illustrates an example of a process in which the prohibition rule processor 380 according to the second embodiment outputs print setting information and corresponds to the process of outputting print setting information according to the first embodiment illustrated in FIG. 8A.

The prohibition rule processor 380 receives print setting information from the desktop application 320 in Step S2211.

In Step S2212, the prohibition rule processor 380 acquires the model identification information (for example, the model name or the like) stored in the queue property bag 340b.

In Step S2213, the prohibition rule processor 380 acquires model information specified by the acquired model identification information from the driver property bag 340a. For example, the prohibition rule processor 380 specifies the model of the printer 120 by using the acquired model identification information and acquires model information corresponding to the specified model from the driver property bag 340a.

In Step S2214, the prohibition rule processor 380 evaluates the validity of the model common information based on the acquired model information. The evaluation of the validity of the model common information is performed by checking whether the value of the print setting information, which is common to each printer, not depending on the model is a valid value.

Preferably, in a case where the result of the checking is not valid, prohibition rule processor 380 executes prohibition rule processing (for example, change, deletion, or the like of a setting item, a set value, and the like that are not valid) solving a contradiction of the print setting information, and a contradiction of the setting items, set values, and the like of the print setting information that is common to models is resolved.

In Step S2215, the prohibition rule processor 380 evaluates the validity of set values of the model specific information based on the model information and the model state that have been acquired.

The evaluation of the validity of the set values of the model specific information is performed by checking that option information, a finishing function, and the like do not exceed the capability of the selected printer 120 for each setting item of the print setting information depending on the model of the printer 120.

Preferably, in a case where the result of the checking is not valid, the prohibition rule processor 380 executes prohibition rule processing (for example, change, deletion, or the like of a setting item, a set value, and the like that are not valid) solving a contradiction of the print setting information, and a contradiction of setting items, set values, and the like of the print setting information depending on the model is resolved.

In Step S2216, the prohibition rule processor 380 returns print setting information on which a result of the evaluation of the validity of the print setting information in Steps S2214 and S2215 is reflected to the desktop application 320, and the process ends.

(Process of Outputting Print Capability Information)

FIG. 22B illustrates a flowchart that illustrates an example of the process of outputting print capability information according to the second embodiment. This process illustrates an example of the process in which the prohibition rule processor 380 according to the second embodiment outputs print capability information and corresponds to the process of outputting print capability information according to the first embodiment illustrated in FIG. 8B.

The prohibition rule processor 380, in Step S2221, receives a print capability information building command from the desktop application 320.

In Step S2222, the prohibition rule processor 380 acquires model identification information (for example, a model name) stored in the queue property bag 340b.

In Step S2223, the prohibition rule processor 380 acquires model information specified by the acquired model identification information from the driver property bag 340a. For example, the prohibition rule processor 380 specifies the model of the printer 120 by using the acquired model identification information and acquires model information corresponding to the specified model from the driver property bag 340a.

In Step S2224, the prohibition rule processor 380 builds print capability information and language information. In building the print capability information, options of set values are built for each setting item. In addition, as the language information, language information of each set value is built based on the locale (the setting of a country or a region) of the OS 410 or the desktop application 320.

In Step S2225, the prohibition rule processor 380 corrects the print capability information built in Step S2224 based on the option information included in the model state of the current printer 120 that is stored in the queue property bag 340b. The correction of the print capability information, for example, includes addition, deletion, and the like of options of the set value.

In Step S2226, the prohibition rule processor 380 returns the print capability information corrected in Step S2225 to the desktop application 320, and the process ends.

(Display Process Using Store Display)

Figure 22C:
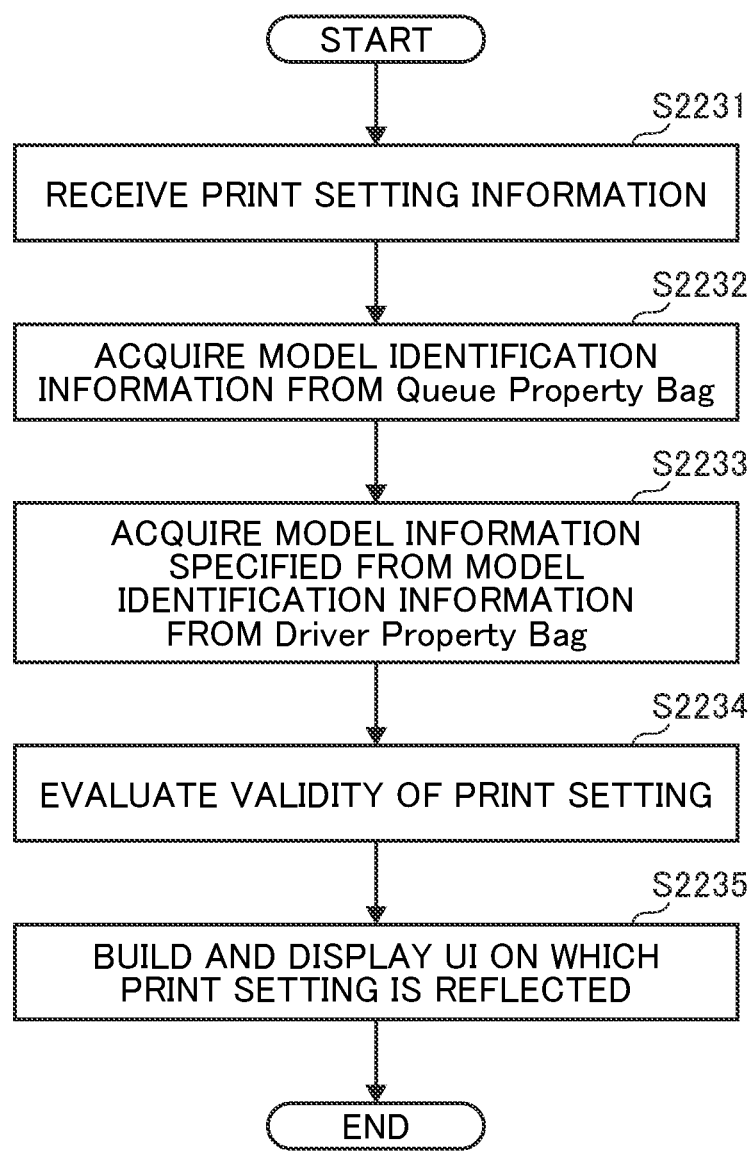

FIG. 22C illustrates a flowchart that illustrates an example of a display process using the store display 370 according to the second embodiment. This process illustrates an example of a process in which the prohibition rule processor 380 according to the second embodiment displays the print setting screen and corresponds to the process in which the store display 370 according to the first embodiment illustrated in FIG. 8C builds a store UI.

The store display 370, in Step S2231, acquires print setting information from the prohibition rule processor 380.

In Step S2232, the store display 370 acquires model identification information (for example, a model name) stored in the queue property bag 340b.

In Step S2233, the store display 370 acquires model information specified by the acquired model identification information from the driver property bag 340a. For example, the store display 370 specifies a model of the printer 120 based on the acquired model identification information and acquires model information corresponding to the specified model from the driver property bag 340a.

In Step S2234, the store display 370 generates print capability information corresponding to the model that is currently connected by using the prohibition rule processor 380 and evaluates the validity of the print setting information.

In Step S2235, the store display 370 builds and displays a UI on which the print setting information is reflected for the print capability information of the model that is currently connected, and the process ends.

Here, Step S2234 does not necessarily need to be performed. In a case where Step S2234 is not performed, the store display 370, in Step S2235, by using the model information corresponding to the model, which is currently connected, acquired in Step S2233, builds and displays a UI used for accepting a print setting. In addition, in Step S2233, the model state may be acquired from the queue property bag 340b together with the model information, and, in Step S2235, a UI may be built by further using the model state.

According to the process described above, the prohibition rule processor 380 and the store display 370, even in a case where the connection information is not stored in the queue property bag 340b, can acquire the model information of the printer 120 that is currently connected and execute a predetermined process.

As above, according to each embodiment of the present invention, in the configuration of the V4 printer driver, a printer driver, an information processing apparatus, and an image processing apparatus configuring a model common printer driver can be provided.

Each function of the embodiment of the present invention described above can be realized by a program, which is described in C, C++, C#, Java (registered trademark), or the like, capable of executing an apparatus, and a program according to this embodiment can be distributed with being stored in an apparatus-readable recording medium such as a hard disk device, a compact disc read only memory (CD-ROM), a magneto-optical disc (MO), a digital versatile disc (DVD), a flexible disc, an electrically erasable programmable read-only memory (EEPROM), or an erasable programmable read only memory (EPROM) and can be transmitted through a network in a format that is compatible with other apparatuses.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus communicably connected with a printer, comprising:
   a plurality of applications including at least a first application and a second application;
   a printer driver to control display of a screen for performing print settings for the printer, including a first module configured to accept a print request from the first application and a second module configured to accept a print request from the second application,
   wherein the first module includes:
      an acquirer configured to acquire model identification information identifying a model of the printer currently connected with the information processing apparatus through a network; and
      a storage controller configured to store connection destination information according to the model of the printer in a storage area that is accessible from the second module, wherein the connection destination information includes model information of the printer in a format readable by the second module,
   wherein the second module displays a screen according to the model of the printer using the connection destination information read from the storage area, and
   wherein the first module further includes:
      a generator configured to acquire the model information of the printer currently connected, from among a plurality of items of model information respectively corresponding to a plurality of printers that are previously stored in an area other than the storage area, and to generate a simplified version of the connection destination information using, from among the acquired information, only information to be used for displaying a print setting screen by the second module,
   wherein generation of the simplified version of the connection destination information includes removing, from among the acquired information, extra information not to be used for displaying the print setting screen by the second module.

2. The information processing apparatus according to claim 1, wherein the generator is further configured to generate the connection destination information based on the acquired model information in a format that can be processed using a script language.

3. The information processing apparatus according to claim 2, wherein the connection destination information includes model common information that is common to the plurality of printers and model specific information that is set specific to the printer currently connected.

4. The information processing apparatus according to claim 2, further comprising a third module configured to read the connection destination information from the storage area and perform prohibition rule processing based on the connection destination information.

5. The information processing apparatus according to claim 4, wherein the third module is configured to evaluate validity of print setting information representing a set value of each of a plurality of print setting items, and generate print capability information representing a list of one or more settable print setting items that are determined to be settable based on the evaluation.

6. The information processing apparatus according to claim 5, wherein the storage area is a queue property bag.

7. The information processing apparatus according to claim 4,
wherein the connection destination information includes encryption information including an encryption system and information used for encryption, and
wherein the third module is configured to encrypt, using the encryption information, at least one of: print setting information representing a set value of each of a plurality of print setting items; and print capability information representing a list of one or more settable print setting items.

8. The information processing apparatus according to claim 2,
wherein the storage area further stores customize information to be used for changing partly or entirely of at least one of: print setting information representing a set value of each of a plurality of print setting items; and print capability information representing a list of one or more settable print setting items, and
wherein the storage controller is configured to apply the customize information to generate the connection destination information.

9. The information processing apparatus according to claim 1,
wherein the second application is a store application provided from a Windows (registered trademark) store, and the second module is configured to display a print setting screen in response to a print request from the store application.

10. The information processing apparatus according to claim 9,
wherein the first module is a printer extension, and
wherein the second module is a store device application.

11. The information processing apparatus according to claim 1, wherein the acquirer is configured to acquire the model identification information of the printer, from the printer or in accordance with an input from a user, in response to receiving a request from an installer, the installer being configured to perform installation of the printer driver, switching of the model, or a call of a print setting screen.

12. The information processing apparatus according to claim 1, wherein the connection destination information is model identification information for identifying a model of the printer currently connected to the information processing apparatus.

13. An image processing system comprising:
the information processing apparatus according to claim 1; and
the printer configured to perform printing based on a print job output from the information processing apparatus.

14. A printer driver stored in a non-transitory recording medium, comprising:
a first module configured to accept a print request from a first application and control display of a screen for performing print settings; and
a second module configured to accept a print request from a second application and control display of a screen for performing print settings,
wherein the printer driver, when installed on an information processing apparatus, causes the information processing apparatus to perform a method comprising:
using the first module, acquiring model identification information identifying a model of the printer currently connected with the information processing apparatus through a network; and
using the first module, storing connection destination information according to the model of the printer in a storage area that is accessible from the second module, wherein the connection destination information includes model information of the printer in a format readable by the second module,
using the second module, displaying a screen according to the model of the printer using the connection destination information read from the storage area,
using the first module, acquiring the model information of the printer currently connected, from among a plurality of items of model information respectively corresponding to a plurality of printers that are previously stored in an area other than the storage area, and
using the first module, generating a simplified version of the connection destination information using, from among the acquired information, only information to be used for displaying a print setting screen by the second module, wherein generating simplified version of the connection destination information includes removing, from among the acquired information, extra information not to be used for displaying the print setting screen by the second module.

* * * * *